(12) United States Patent
Shiratori et al.

(10) Patent No.: US 11,498,391 B2
(45) Date of Patent: Nov. 15, 2022

(54) AIR CONDITIONER

(71) Applicant: DENSO CORPORATION, Kariya (JP)

(72) Inventors: Kosuke Shiratori, Kariya (JP); Yoshiki Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 282 days.

(21) Appl. No.: 16/775,058

(22) Filed: Jan. 28, 2020

(65) Prior Publication Data

US 2020/0164719 A1 May 28, 2020

Related U.S. Application Data

(63) Continuation of application No. PCT/JP2018/025530, filed on Jul. 5, 2018.

(30) Foreign Application Priority Data

Jul. 31, 2017 (JP) .............................. JP2017-148191

(51) Int. Cl.
| | | |
|---|---|---|
| *B60H 1/00* | (2006.01) | |
| *B60H 1/03* | (2006.01) | |
| *B60H 1/32* | (2006.01) | |

(52) U.S. Cl.
CPC ..... *B60H 1/00885* (2013.01); *B60H 1/00021* (2013.01); *B60H 1/00328* (2013.01);
(Continued)

(58) Field of Classification Search
CPC ...... B60H 1/3227; B60H 1/3207; B60H 1/03; B60H 1/00485; B60H 1/00328;
(Continued)

(56) References Cited

U.S. PATENT DOCUMENTS 10,899,195 B2 * 1/2021 Miura ....................... F25B 1/00
2004/0035130 A1 2/2004 Amaral et al.
(Continued)

FOREIGN PATENT DOCUMENTS

JP 2005145204 A * 6/2005 ........... F28D 1/0435
JP 2010281561 A 12/2010
(Continued)

OTHER PUBLICATIONS

JP 2005145204 A English Machine Translation (Year: 2005).*
JP 2014160594 A English Machine Translation (Year: 2014).*

*Primary Examiner* — Jenna M Hopkins
(74) *Attorney, Agent, or Firm* — Harness, Dickey & Pierce, P.L.C.

(57) ABSTRACT

An air conditioner is configured to be switchable between a heating mode and a cooling mode. In the cooling mode, a high-temperature heat medium circulates between a high-pressure side refrigerant-heat medium heat exchanger and a high-temperature heat medium-outside air heat exchanger in a state where a refrigerant circulates in an air-cooling heat exchanger. In the heating mode, the high-temperature heat medium circulates between the high-pressure side refrigerant-heat medium heat exchanger and an air-heating heat exchanger, while a low-temperature heat medium circulates between a low-pressure side refrigerant-heat medium heat exchanger and a low-temperature heat medium-outside air heat exchanger, in a state where the refrigerant circulates in the low-pressure side refrigerant-heat medium heat exchanger.

17 Claims, 11 Drawing Sheets

(52) U.S. Cl.
CPC ............ *B60H 1/00485* (2013.01); *B60H 1/03* (2013.01); *B60H 1/3207* (2013.01); *B60H 1/3227* (2013.01); *B60H 2001/00078* (2013.01)

(58) Field of Classification Search
CPC ............ B60H 1/00021; B60H 1/00885; B60H 2001/00078
See application file for complete search history.

(56) References Cited

U.S. PATENT DOCUMENTS

| | | | |
|---|---|---|---|
| 2004/0050086 A1 | 3/2004 | Amaral et al. | |
| 2004/0050089 A1 | 3/2004 | Amaral | |
| 2004/0089003 A1 | 5/2004 | Amaral et al. | |
| 2004/0089014 A1 | 5/2004 | Amaral et al. | |
| 2012/0247137 A1* | 10/2012 | Nakajo | B60H 1/00885 |
| | | | 62/160 |
| 2013/0312447 A1 | 11/2013 | Inaba et al. | |
| 2015/0121939 A1* | 5/2015 | Takeuchi | H01M 10/6563 |
| | | | 62/324.6 |
| 2015/0260439 A1* | 9/2015 | Ohta | F25B 41/34 |
| | | | 137/511 |
| 2015/0338173 A1 | 11/2015 | Katoh | |
| 2016/0109163 A1 | 4/2016 | Enomoto et al. | |
| 2016/0214461 A1* | 7/2016 | Kuroda | B60H 1/00885 |
| 2016/0265819 A1 | 9/2016 | Durrani et al. | |
| 2017/0021698 A1* | 1/2017 | Hatakeyama | B60H 1/143 |
| 2017/0267066 A1* | 9/2017 | Hong | B60H 1/32281 |
| 2017/0274725 A1* | 9/2017 | Miyakoshi | B60H 1/00921 |

FOREIGN PATENT DOCUMENTS

| | | | |
|---|---|---|---|
| JP | 4718745 B2 | | 7/2011 |
| JP | 2012181005 A | | 9/2012 |
| JP | 2014126339 A | | 7/2014 |
| JP | 2014160594 A | * | 9/2014 |
| KR | 1020130026872 | | 7/2013 |
| KR | 20160110063 A | | 9/2016 |
| WO | WO-2012108211 A1 | | 8/2012 |
| WO | WO-2014136446 A | | 9/2014 |
| WO | WO-2014196186 A1 | | 12/2014 |

* cited by examiner

AIR CONDITIONER

CROSS REFERENCE TO RELATED APPLICATION

The present application is a continuation application of International Patent Application No. PCT/JP2018/025530 filed on Jul. 5, 2018, which designated the U.S. and claims the benefit of priority from Japanese Patent Application No. 2017-148191 filed on Jul. 31, 2017. The entire disclosures of all of the above applications are incorporated herein by reference.

TECHNICAL FIELD

The present disclosure relates to an air conditioner capable of cooling and heating air.

SUMMARY

According to an aspect of the present disclosure, an air conditioner may execute a cooling mode in which a high-temperature heat medium circulates between a high-pressure side refrigerant-heat medium heat exchanger and a high-temperature heat medium-outside air heat exchanger in a state where the refrigerant circulates in an air-cooling heat exchanger, and the air conditioner may execute a heating mode in which the high-temperature heat medium circulates between the high-pressure side refrigerant-heat medium heat exchanger and an air-heating heat exchanger, while a low-temperature heat medium circulates between a low-pressure side refrigerant-heat medium heat exchanger and a low-temperature heat medium-outside air heat exchanger, in a state where the refrigerant circulates in the low-pressure side refrigerant-heat medium heat exchanger.

Thus, the air conditioner can be switched between the heating mode and the cooling mode by switching the flow of the high-temperature heat medium in the high-temperature heat medium circuit and the flow of the low-temperature heat medium in the low-temperature heat medium circuit.

DESCRIPTION OF EMBODIMENTS

Figure 1:
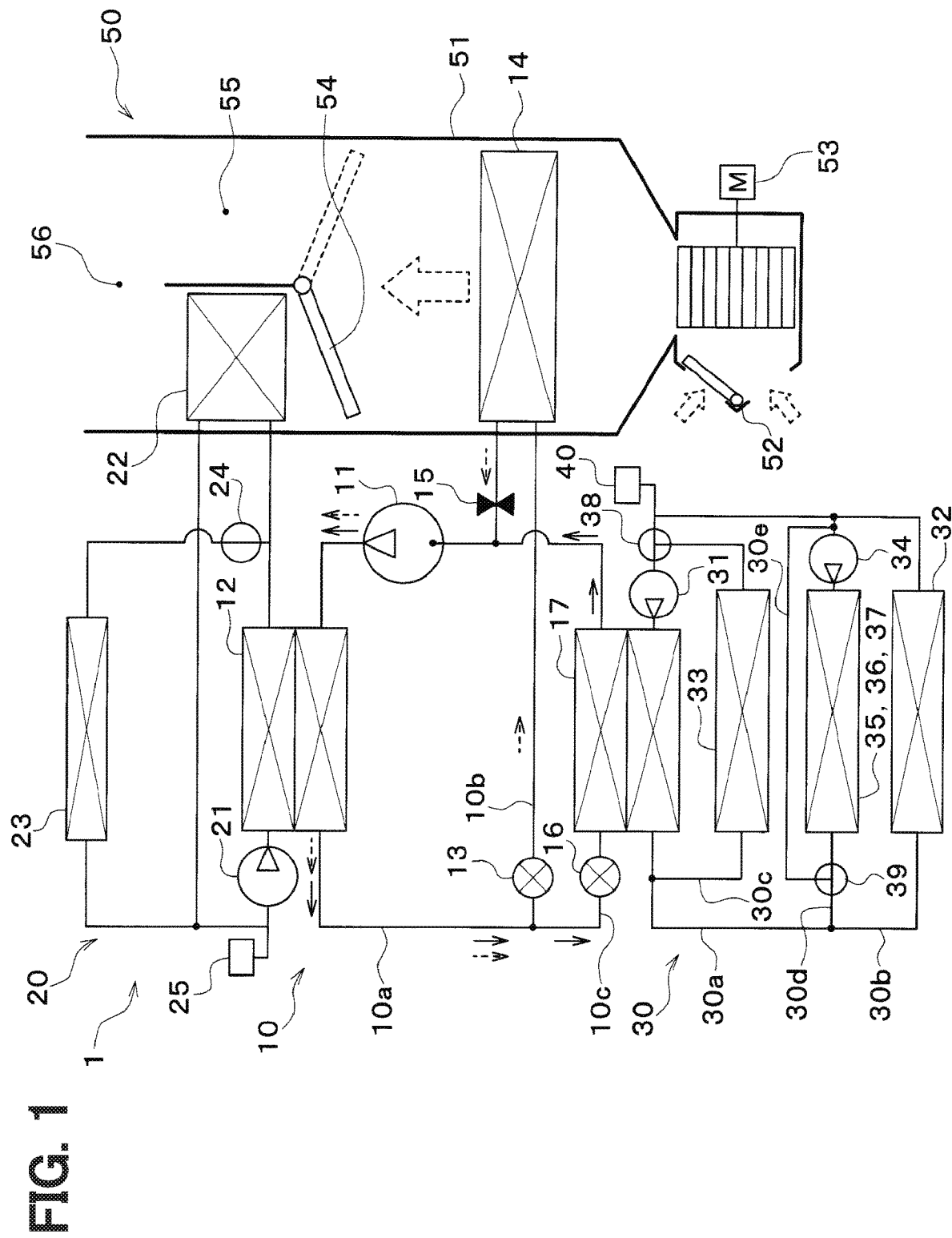
FIG. 1 is an entire configuration diagram of an air conditioner in a first embodiment.

A refrigeration cycle device used in an air conditioner may switch a refrigerant circuit between a heating mode and a cooling mode. In the heating mode, an exterior heat exchanger functions as a radiator, whereas in the cooling mode, the exterior heat exchanger functions as an evaporator.

That is, the state of the exterior heat exchanger is plotted in the Mollier diagram to show a higher pressure in the heating mode and a lower pressure in the cooling mode.

However, according to the studies conducted by the inventors of the present disclosure, such a configuration of the refrigeration cycle device that switches between high and low pressures of the exterior heat exchanger depending on the operation mode requires a pressure adjustment valve or switching valve for a refrigerant circuit, thus making the refrigerant circuit complicated. In addition, this configuration also requires complicated control together with the switching because an appropriate cycle balance in the respective operation modes becomes necessary.

It is an object of the present disclosure to simplify a circuit configuration and switching control in an air conditioner that is configured to be switchable between a heating mode and a cooling mode.

An air conditioner according to an aspect of the present disclosure may include:

a compressor configured to draw, compress, and discharge a refrigerant; a high-pressure side refrigerant-heat medium heat exchanger configured to exchange heat between the refrigerant discharged from the compressor and a high-temperature heat medium; an air-heating heat exchanger configured to exchange heat between the high-temperature heat medium heat-exchanged in the high-pressure side refrigerant-heat medium heat exchanger and air which is to be blown into a space to be air-conditioned; a high-temperature heat medium-outside air heat exchanger configured to exchange heat between the high-temperature heat medium and outside air; a high-temperature heat medium circuit in which the high-temperature heat medium circulates to the high-pressure side refrigerant-heat medium heat exchanger, the air-heating heat exchanger, and the high-temperature heat medium-outside air heat exchanger; a decompression portion configured to decompress the refrigerant heat-exchanged in the high-pressure side refrigerant-heat medium heat exchanger; a low-pressure side refrigerant-heat medium heat exchanger configured to exchange heat between the refrigerant decompressed by the decompression portion and a low-temperature heat medium; an air-cooling heat exchanger configured to exchange heat between the refrigerant decompressed by the decompression portion and the air; a heat generating device configured to generate heat during an operation and to be cooled by the low-temperature heat medium; a low-temperature heat medium-outside air heat exchanger configured to exchange heat between the low-temperature heat medium and the outside air; a low-temperature heat medium circuit in which the low-temperature heat medium circulates to the low-pressure side refrigerant-heat medium heat exchanger, the heat generating device, and the low-temperature heat medium-outside air heat exchanger; a high-temperature switching portion configured to switch a flow of the high-temperature heat medium in the high-temperature heat medium circuit; and a low-temperature switching portion configured to switch a flow of the low-temperature heat medium in the low-temperature heat medium circuit.

The air conditioner may execute a cooling mode in which the high-temperature switching portion causes the high-temperature heat medium to circulate between the high-pressure side refrigerant-heat medium heat exchanger and the high-temperature heat medium-outside air heat exchanger in a state where the refrigerant circulates in the air-cooling heat exchanger, and the air conditioner executes a heating mode in which the high-temperature switching portion causes the high-temperature heat medium to circulate between the high-pressure side refrigerant-heat medium heat exchanger and the air-heating heat exchanger, while the low-temperature switching portion causes the low-temperature heat medium to circulate between the low-pressure side refrigerant-heat medium heat exchanger and the low-temperature heat medium-outside air heat exchanger, in a state where the refrigerant circulates in the low-pressure side refrigerant-heat medium heat exchanger.

Thus, the air conditioner can be switched between the heating mode and the cooling mode by switching the flow of the high-temperature heat medium in the high-temperature heat medium circuit and the flow of the low-temperature heat medium in the low-temperature heat medium circuit.

For example, the refrigerant cycle may be configured to be in a state where the refrigerant circulates through the air-cooling heat exchanger in the cooling mode and to be in a state where the refrigerant circulates through the low-pressure side refrigerant-heat medium heat exchanger in the heating mode. In this case, the controller may be configured such that in the cooling mode, the high-temperature switching portion causes the high-temperature heat medium to circulate between the high-pressure side refrigerant-heat medium heat exchanger and the high-temperature heat medium-outside air heat exchanger. In addition, the controller may be configured such that in the heating mode, the high-temperature switching portion causes the high-temperature heat medium to circulate between the high-pressure side refrigerant-heat medium heat exchanger and the air-heating heat exchanger, while the low-temperature switching portion causes the low-temperature heat medium to circulate between the low-pressure side refrigerant-heat medium heat exchanger and the low-temperature heat medium-outside air heat exchanger.

Therefore, the switching between the high and low pressures in the cycle is not necessary for the heat exchanger, making it possible to simplify the circuit configuration and the switching control of the air conditioner.

Embodiments will be described below with reference to the accompanying drawings. Parts that are the same or equivalent to each other in the following respective embodiments are denoted by the same reference numerals in the drawings.

First Embodiment

Figure 2:
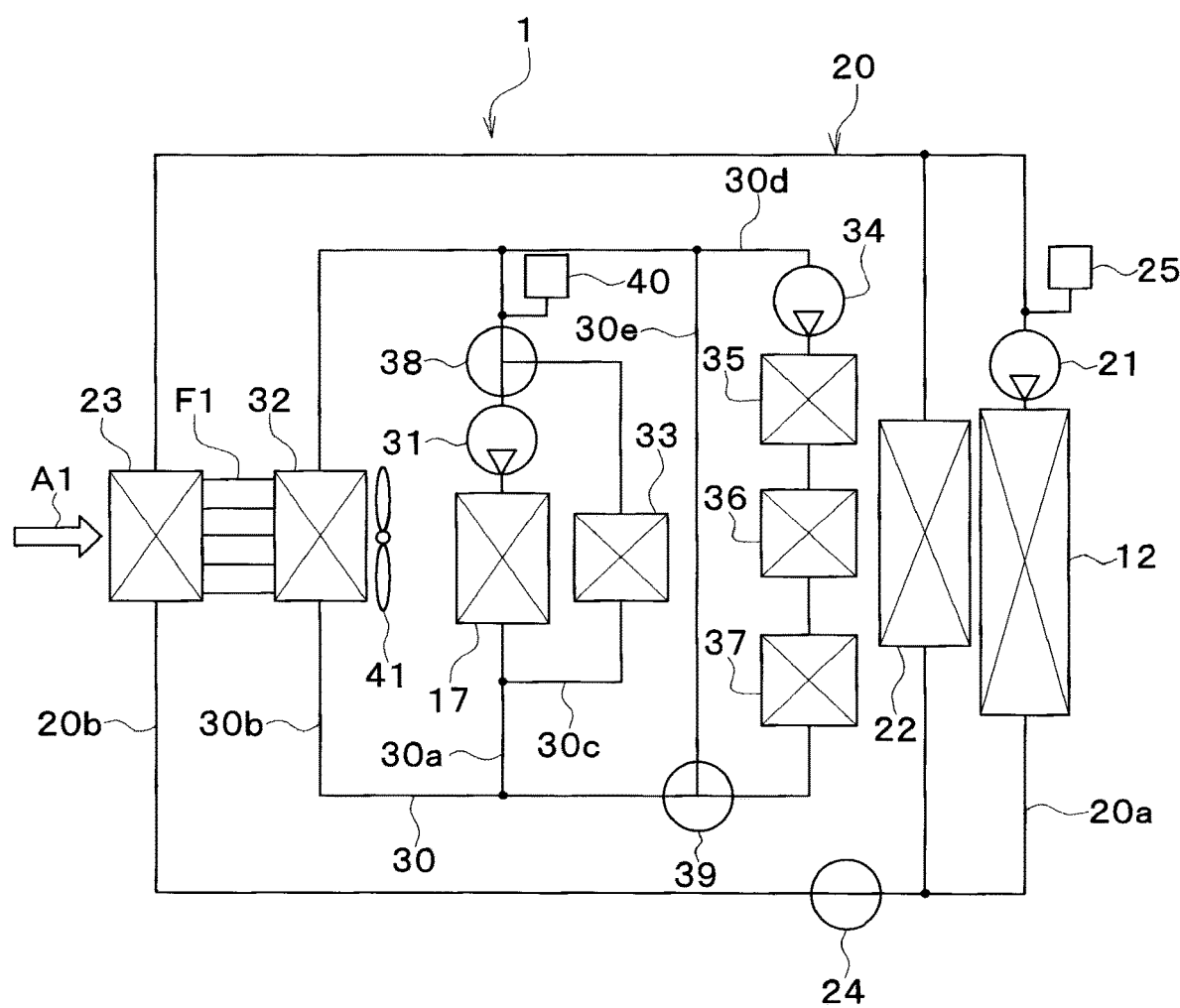
FIG. 2 is a configuration diagram of a coolant circuit of the air conditioner in the first embodiment.

An embodiment will be described below with reference to the accompanying drawings. A vehicle air conditioner 1 shown in FIGS. 1 and 2 is an air conditioner that regulates the temperature of a space inside a vehicle cabin (in other words, a space to be air-conditioned) to an appropriate level. The vehicle air conditioner 1 includes a refrigeration cycle device 10. In the present embodiment, the refrigeration cycle device 10 is mounted on a hybrid vehicle that obtains the driving force for traveling from both an engine (i.e., internal combustion engine) and an electric motor for traveling.

The hybrid vehicle in the present embodiment is configured as a plug-in hybrid vehicle that can charge a battery (i.e., a vehicle-mounted battery) mounted on the vehicle, with power supplied from an external power source (i.e., commercial power source) when the vehicle stops. For example, a lithium ion battery can be used as the battery.

The driving force output from the engine is used not only to cause the vehicle to travel, but also to operate a power generator. The electric power generated by the power generator and the electric power supplied from the external power source can be stored in the battery. The electric power stored in the battery is supplied not only to a traveling electric motor, but also to various vehicle-mounted devices, including electric components constituting the refrigeration cycle device 10.

The refrigeration cycle device 10 is a vapor compression refrigerator that includes a compressor 11, a condenser 12, a first expansion valve 13, an air-cooling evaporator 14, a constant pressure valve 15, a second expansion valve 16, and a coolant cooling evaporator 17. The refrigeration cycle device 10 in the present embodiment forms a subcritical refrigeration cycle in which a high-pressure side refrigerant pressure does not exceed the critical pressure of the refrigerant, using a fluorocarbon refrigerant as the refrigerant.

The refrigeration cycle device 10 includes a series refrigerant flow passage 10a, a first parallel refrigerant flow passage 10b, and a second parallel refrigerant flow passage 10c. The series refrigerant flow passage 10a, the first parallel refrigerant flow passage 10b, and the second parallel refrigerant flow passage 10c are flow passages through which the refrigerant flows.

A refrigerant circulation circuit in which the refrigerant circulates is formed by the series refrigerant flow passage 10a, the first parallel refrigerant flow passage 10b, and the second parallel refrigerant flow passage 10c. The first parallel refrigerant flow passage 10b and the second parallel refrigerant flow passage 10c are connected to the series refrigerant flow passage 10a such that the refrigerants flowing through the first and second parallel refrigerant flow passages 10b and 10c flow in parallel with each other.

In the series refrigerant flow passage 10a, the compressor 11 and the condenser 12 are arranged in series with each other in this order, in the flow of the refrigerant.

In the first parallel refrigerant flow passage 10b, the first expansion valve 13, the air-cooling evaporator 14, and the constant pressure valve 15 are arranged in series with each other in this order, in the flow of the refrigerant.

In the second parallel refrigerant flow passage 10c, the second expansion valve 16 and the coolant cooling evaporator 17 are arranged in series with each other in this order, in the flow of the refrigerant.

The series refrigerant flow passage 10a and the first parallel refrigerant flow passage 10b form a refrigerant circulation circuit in which the refrigerant circulates through the compressor 11, the condenser 12, the first expansion valve 13, the air-cooling evaporator 14, the constant pressure valve 15, and the compressor 11 in this order.

The series refrigerant flow passage 10a and the second parallel refrigerant flow passage 10c forms a refrigerant circulation circuit in which the refrigerant circulates through the compressor 11, the condenser 12, the second expansion valve 16, and the coolant cooling evaporator 17 in this order.

The compressor 11 is an electric compressor driven by electric power supplied from the battery. The compressor 11 draws, compresses, and discharges the refrigerant in the refrigeration cycle device 10. The compressor 11 may be a variable displacement compressor driven by a belt.

The condenser 12 is a high-pressure side refrigerant-heat medium heat exchanger that exchanges heat between a high-pressure side refrigerant discharged from the compressor 11 and the coolant in a high-temperature coolant circuit 20 to thereby condense the high-pressure side refrigerant.

The coolant in the high-temperature coolant circuit 20 is a fluid as a heat medium. The coolant in the high-temperature coolant circuit 20 is the high-temperature heat medium. In the present embodiment, the coolant suitable for use in the high-temperature coolant circuit 20 includes a liquid containing at least ethylene glycol, dimethylpolysiloxane, or a nanofluid, or an antifreezing fluid. The high-temperature coolant circuit 20 is a high-temperature heat medium circuit in which the high-temperature heat medium circulates.

The first expansion valve 13 is a first decompression portion that decompresses and expands a liquid-phase refrigerant flowing out of the condenser 12. The first expansion valve 13 is an electric variable throttle mechanism and includes a valve body and an electric actuator. The valve body is configured to be capable of changing a passage opening degree (in other words, a throttle opening degree) of the refrigerant passage. The electric actuator has a stepping motor that changes the throttle opening degree of the valve body.

The first expansion valve 13 is constituted of a variable throttle mechanism with the fully closing function of fully closing the refrigerant passage. That is, the first expansion valve 13 can shut off the flow of the refrigerant by fully closing the refrigerant passage. The operation of the first expansion valve 13 is controlled by a control signal output from a controller 60 shown in FIG. 3.

The air-cooling evaporator 14 is a refrigerant-air heat exchanger that cools air to be blown into the vehicle cabin by exchanging heat between the refrigerant flowing out of the first expansion valve 13 and the air to be blown into the vehicle cabin. In the air-cooling evaporator 14, the refrigerant absorbs heat from the air to be blown into the vehicle cabin.

The constant pressure valve 15 is a pressure adjustment portion (i.e., pressure adjustment depression portion) that maintains the pressure of the refrigerant at the outlet side of the air-cooling evaporator 14 at a predetermined value.

The constant pressure valve 15 is constituted of a mechanical variable throttle mechanism. Specifically, the constant pressure valve 15 decreases the passage area (i.e., throttle opening degree) of the refrigerant passage when the pressure of the refrigerant at the outlet side of the air-cooling evaporator 14 falls below the predetermined value, and increases the passage area (i.e., throttle opening degree) of the refrigerant passage when the pressure of the refrigerant at the outlet side of the air-cooling evaporator 14 exceeds the predetermined value.

A fixing throttle, such as an orifice or a capillary tube, may be employed in place of the constant pressure valve 15, for example, when the flow rate of the refrigerant circulating in the cycle varies little.

The second expansion valve 16 is a second decompression portion that decompresses and expands a liquid-phase refrigerant flowing out of the condenser 12. The second expansion valve 16 is an electric variable throttle mechanism and includes a valve body and an electric actuator. The valve body is configured to be capable of changing a passage opening degree (in other words, a throttle opening degree) of the refrigerant passage. The electric actuator has a stepping motor that changes the throttle opening degree of the valve body.

The second expansion valve 16 is constituted of a variable throttle mechanism with the fully closing function of fully closing the refrigerant passage. That is, the second expansion valve 16 can shut off the flow of the refrigerant by fully closing the refrigerant passage. The operation of the second expansion valve 16 is controlled by a control signal output from the controller 60.

The coolant cooling evaporator 17 is a low-pressure side refrigerant-heat medium heat exchanger that exchanges heat between a low-pressure refrigerant flowing out of the second expansion valve 16 and the coolant in the low-temperature coolant circuit 30, thereby evaporating the low-pressure refrigerant. The gas-phase refrigerant evaporated at the coolant cooling evaporator 17 is drawn into and compressed by the compressor 11.

The coolant in the low-temperature coolant circuit 30 is a fluid as the heat medium. The coolant in the low-temperature coolant circuit 30 is the low-temperature heat medium. In the present embodiment, the coolant suitable for use in the low-temperature coolant circuit 30 includes a liquid containing at least ethylene glycol, dimethylpolysiloxane, or a nanofluid, or an antifreezing fluid. The low-temperature coolant circuit 30 is a low-temperature heat medium circuit in which the low-temperature heat medium circulates.

The condenser 12, a high-temperature side pump 21, a heater core 22, a high-temperature side radiator 23, a two-way valve 24, and a high-temperature side reserve tank 25 are disposed in the high-temperature coolant circuit 20.

The high-temperature side pump 21 is a heat medium pump that draws and discharges the coolant. The high-temperature side pump 21 is an electric pump.

The high-temperature side pump 21 is a high-temperature side flow rate adjustment portion that adjusts the flow rate of the coolant circulating in the high-temperature coolant circuit 20. A first low-temperature side pump 31 and the second low-temperature side pump 34 are low-temperature side flow rate adjustment portions that adjust the flow rate of the coolant circulating in the low-temperature coolant circuit 30.

The heater core 22 is an air-heating heat exchanger that heats the air to be blown into the vehicle cabin, by exchanging heat between the coolant in the high-temperature coolant circuit 20 and the air to be blown into the vehicle cabin. In the heater core 22, the coolant dissipates its heat into the air to be blown into the vehicle cabin. The high-temperature side radiator 23 is a high-temperature heat medium-outside air heat exchanger that exchanges heat between the coolant in the high-temperature coolant circuit 20 and the outside air.

The condenser 12, the high-temperature side pump 21, and the heater core 22 are disposed in a high-temperature side circulation flow passage 20a. The high-temperature side circulation flow passage 20a is a flow passage through which the high-temperature side coolant circulates.

The high-temperature side radiator 23 and the two-way valve 24 are disposed in a radiator flow passage 20b. The radiator flow passage 20b is a flow passage in which the high-temperature side coolant flows in parallel with the heater core 22.

The two-way valve 24 is a solenoid valve that opens and closes the radiator flow passage 20b. The operation of the two-way valve 24 is controlled by the controller 60. The two-way valve 24 is a high-temperature switching portion that switches the flow of the coolant in the high-temperature coolant circuit 20.

The two-way valve 24 may be a thermostat. The thermostat is a coolant thermo-sensitive valve that has a mechanical mechanism to open and close the coolant flow passage by displacing its valve body using thermowax, which changes its volume depending on the temperature.

The high-temperature side reserve tank 25 is a coolant reservoir that stores therein extra coolant. The extra coolant is stored in the high-temperature side reserve tank 25, thus making it possible to suppress a decrease in liquid amount of the coolant circulating through the respective flow passages.

The high-temperature side reserve tank 25 is a hermetically sealed reserve tank or an open-air reserve tank. The hermetically sealed reserve tank is a reserve tank configured such that the pressure at the liquid surface of the coolant stored therein becomes a predetermined pressure. The open-air reserve tank is a reserve tank configured such that the pressure at the liquid surface of the coolant stored therein becomes an atmospheric pressure.

The coolant cooling evaporator 17, the first low-temperature side pump 31, a low-temperature side radiator 32, a battery 33, the second low-temperature side pump 34, an inverter 35, a charger 36, a motor generator 37, a first three-way valve 38, a second three-way valve 39, and a low-temperature side reserve tank 40 are disposed in the low-temperature side coolant circuit 30.

The first low-temperature side pump 31 and the second low-temperature side pump 34 are heat medium pumps that draw and discharge the coolant. In addition, each of the first low-temperature side pump 31 and the second low-temperature side pump 34 is an electric pump.

The low-temperature side radiator 32 is a low-temperature heat medium-outside air heat exchanger that exchanges heat between the coolant in the low-temperature coolant circuit 30 and the outside air.

The high-temperature side radiator 23 and the low-temperature side radiator 32 are arranged in series in this order, along the flow direction A1 of the outside air. The high-temperature side radiator 23 and the low-temperature side radiator 32 are joined to each other by a common fin F1. The common fin F1 is a heat exchange promoting member that promotes heat exchange between the coolant and the air.

Therefore, the high-temperature side radiator 23 and the low-temperature side radiator 32 are connected to each other by the common fin F1 so as to be able to transfer heat therebetween.

The outside air is blown by an exterior blower 41 to the high-temperature side radiator 23 and the low-temperature side radiator 32.

The exterior blower 41 shown in FIG. 2 is an outside-air blowing portion that blows the outside air toward the high-temperature side radiator 23 and the low-temperature side radiator 32. The exterior blower 41 is an electric blower that drives the fan by an electric motor. The high-temperature side radiator 23, the low-temperature side radiator 32, and the exterior blower 41 are disposed at the forefront of the vehicle. Therefore, the traveling air is allowed to hit the high-temperature side radiator 23 and the low-temperature side radiator 32 when the vehicle is traveling.

The battery 33, the inverter 35, the charger 36, and the motor generator 37 are in-vehicle devices mounted on the vehicle and are heat generating devices that generate heat during their operations. The battery 33, the inverter 35, the charger 36, and the motor generator 37 dissipate waste heat generated with their operations, into the coolant in the low-temperature coolant circuit 30. In other words, the battery 33, the inverter 35, the charger 36, and the motor generator 37 supply heat to the coolant in the low-temperature coolant circuit 30.

The inverter 35 is a power converter that converts a direct-current (DC) power supplied from the battery 33 into an alternating-current (AC) power to output the AC power to the motor generator 37. The charger 36 is a charger that charges the battery 33 with electric power. The motor generator 37 generates the travel driving force using the electric power output from the inverter 35 and also generates a regenerative electric power when the vehicle decelerates or descends a slope.

The low-temperature side reserve tank 40 is a coolant reservoir that stores therein extra coolant. The extra coolant is stored in the low-temperature side reserve tank 40, thus making it possible to suppress a decrease in liquid amount of the coolant circulating through the respective flow passages.

The low-temperature side reserve tank 40 is a hermetically sealed reserve tank or an open-air reserve tank. The hermetically sealed reserve tank is a reserve tank configured such that the pressure at the liquid surface of the coolant stored therein becomes a predetermined pressure. The open-air reserve tank is a reserve tank configured such that the pressure at the liquid surface of the coolant stored therein becomes an atmospheric pressure.

The first three-way valve 38, the first low-temperature side pump 31, the coolant cooling evaporator 17, and the low-temperature side reserve tank 40 are disposed in a low-temperature side main flow passage 30a. The low-temperature side main flow passage 30a is a flow passage through which the low-temperature side coolant flows.

The low-temperature side radiator 32 is disposed in a low-temperature side radiator flow passage 30b. The low-temperature side radiator flow passage 30b is a flow passage through which the low-temperature side coolant flows.

The low-temperature side main flow passage 30a and the low-temperature side radiator flow passage 30b form the coolant circuit in which the low-temperature side coolant circulates.

The battery 33 is disposed in a battery flow passage 30c. The battery flow passage 30c is connected to the low-temperature side main flow passage 30a. The low-temperature side main flow passage 30a and the battery flow passage 30c form the coolant circuit in which the low-temperature side coolant circulates.

The first three-way valve 38 is disposed at a connection portion between the low-temperature side main flow passage 30a and the battery flow passage 30c. The first three-way valve 38 switches between a state where the coolant in the low-temperature side main flow passage 30a circulates through the battery flow passage 30c and a state where the coolant does not circulate therethrough. The operation of the first three-way valve 38 is controlled by the controller 60.

The second low-temperature side pump 34, the inverter 35, the charger 36, and the motor generator 37 are disposed in a device flow passage 30d. The low-temperature side main flow passage 30a and the device flow passage 30d form the coolant circuit in which the low-temperature side coolant circulates.

The device flow passage 30d is connected to a bypass flow passage 30e. The device flow passage 30d and the bypass flow passage 30e form the coolant circuit in which the low-temperature side coolant circulates.

The second three-way valve 39 is disposed at a connection portion between the device flow passage 30d and the bypass flow passage 30e. The second three-way valve 39 switches between a state where the coolant in the low-temperature side main flow passage 30a circulates through the device flow passage 30d and a state where the coolant does not circulate therethrough. Simultaneously, the second three-way valve 39 switches between a state where the coolant in the device flow passage 30d circulates through the bypass flow passage 30e and a state where the coolant does not circulate therethrough. The operation of the second three-way valve 39 is controlled by the controller 60.

The first three-way valve 38 and the second three-way valve 39 constitute a low-temperature switching portion that switches the flow of the coolant in the low-temperature coolant circuit 30.

The air-cooling evaporator 14 and the heater core 22 are accommodated in a casing 51 of an interior air conditioning unit 50 (hereinafter referred to as an air conditioning casing) shown in FIG. 1. The interior air conditioning unit 50 is disposed inside a dashboard (not shown) at the front of the interior of the vehicle cabin. The air conditioning casing 51 is an air passage formation member that defines therein an air passage.

The heater core 22 is disposed at the downstream side of the air flow with respect to the air-cooling evaporator 14 in the air flow passage of the air conditioning casing 51. An inside/outside air switching case 52 and an interior blower 53 are disposed in the air conditioning casing 51. The inside/outside air switching case 52 is an inside/outside air switching portion that switches between the inside air and the outside air to introduce the switched air to the air passage in the air conditioning casing 51. The interior blower 53 draws and blows the inside air and the outside air introduced into the air passage in the air conditioning casing 51 through the inside/outside air switching case 52.

An air mix door 54 is disposed between the air-cooling evaporator 14 and the heater core 22 in the air passage of the air conditioning casing 51. The air mix door 54 adjusts the air volume ratio between the cold air flowing into the heater core 22 and the cold air flowing through a cold air bypass passage 55 in the cold air that has passed through the air-cooling evaporator 14.

The cold air bypass passage 55 is an air passage through which the cold air passing through the air-cooling evaporator 14 flows while bypassing the heater core 22.

The air mix door 54 is a rotary door that has a rotary shaft rotatably supported by the air conditioning casing 51 and a door base portion coupled to the rotary shaft. By adjusting the opening position of the air mix door 54, the temperature of the conditioned air blown from the air conditioning casing 51 into the vehicle cabin can be adjusted to a desired temperature.

The rotary shaft of the air mix door 54 is driven by a servo motor. The operation of the servo motor is controlled by the controller 60.

The air mix door 54 may be a sliding door that slides in the direction substantially orthogonal to the air flow. The sliding door may be a plate-shaped door formed of a rigid body. The sliding door may be a film door formed of a flexible film material.

The conditioned air that has its temperature adjusted by the air mix door 54 is blown from an air outlet 56 formed in the air conditioning casing 51 into the vehicle cabin.

Figure 3:
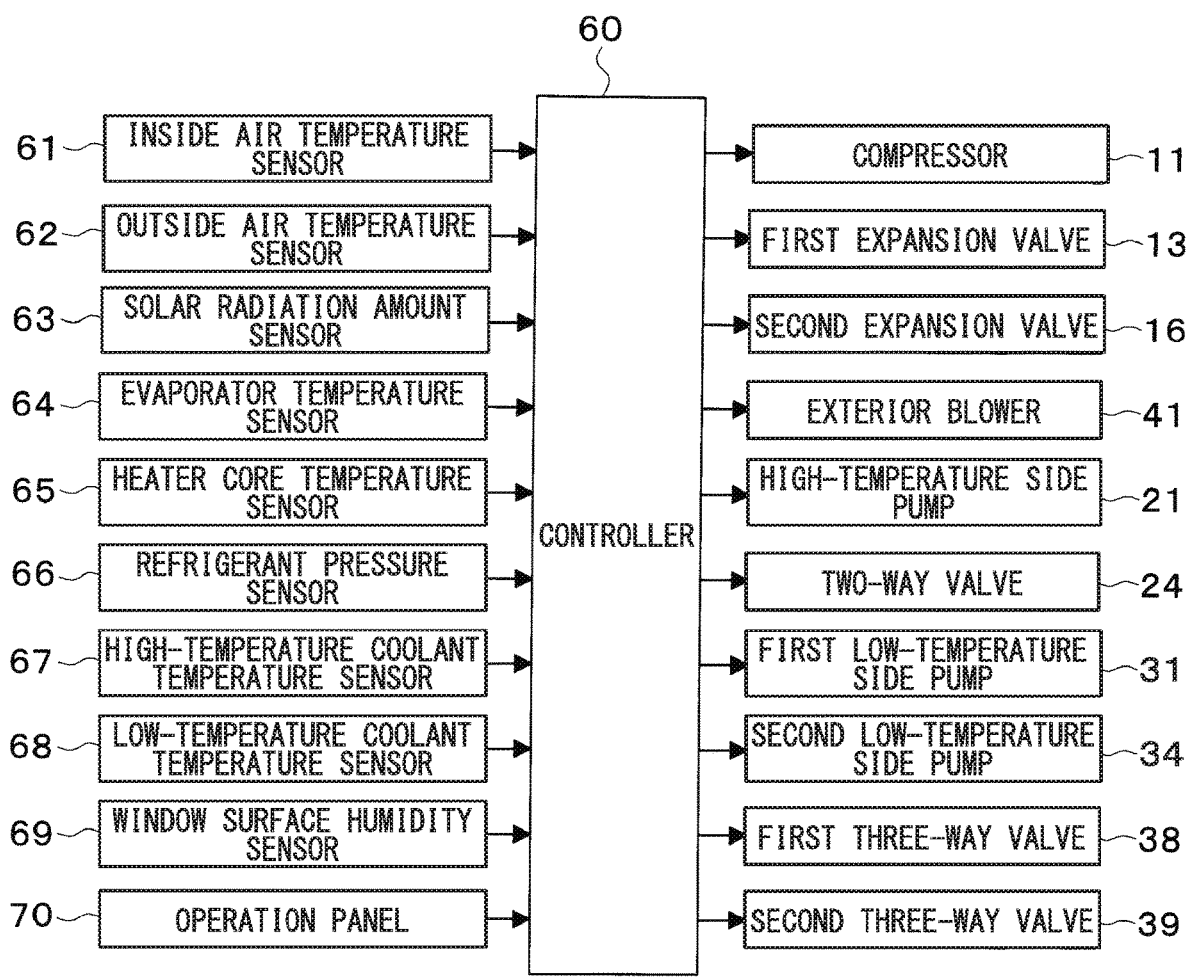
FIG. 3 is a block diagram showing an electric control unit of the air conditioner in the first embodiment.

The controller 60 shown in FIG. 3 is constituted of a well-known microcomputer, including a CPU, a ROM, a RAM, and the like, and peripheral circuits thereof. The controller 60 performs various computation and processing based on control programs stored in the ROM. Various control target devices are connected to the output side of the controller 60. The controller 60 is a control unit that controls the operations of various respective control target devices.

The control target devices controlled by the controller 60 are the compressors 11, the first expansion valve 13, the second expansion valve 16, the exterior blower 41, the high-temperature side pump 21, the two-way valve 24, the first low-temperature side pump 31, the second low-temperature side pump 34, the first three-way valve 38, the second three-way valve 39, and the like.

Software and hardware of the controller 60 that controls the electric motor of the compressor 11 constitute a refrigerant discharge capacity control unit. Software and hardware of the controller 60 that controls the first expansion valve 13 constitute a first throttle control unit. Software and hardware of the controller 60 that controls the second expansion valve 16 constitute a second throttle control unit.

Software and hardware of the controller 60 that controls the exterior blower 41 constitute an outside air blowing capacity control unit. Software and hardware of the controller 60 that controls the high-temperature side pump 21 constitute a high-temperature heat medium flow rate control unit.

Software and hardware of the controller 60 that controls the two-way valve 24 constitute a two-way valve control unit.

Software and hardware of the controller 60 that controls the first low-temperature side pump 31 and the second low-temperature side pump 34 constitute a low-temperature heat medium flow rate control unit.

Software and hardware of the controller 60 that controls the first three-way valve 38 constitute a first three-way valve control unit.

Software and hardware of the controller 60 that controls the second three-way valve 39 constitute a second three-way valve control unit.

A group of various control sensors is connected to the input side of the controller 60. The control sensor group includes an inside air temperature sensor 61, an outside air temperature sensor 62, a solar radiation amount sensor 63, an evaporator temperature sensor 64, a heater core temperature sensor 65, a refrigerant pressure sensor 66, a high-temperature coolant temperature sensor 67, a low-temperature coolant temperature sensor 68, a window surface humidity sensor 69, and the like.

The inside air temperature sensor 61 detects a cabin interior temperature Tr. The outside air temperature sensor 62 detects an outside air temperature Tam. The solar radiation amount sensor 63 detects the solar radiation amount Ts inside the vehicle cabin.

The evaporator temperature sensor 64 is a temperature detector that detects the temperature of the coolant cooling evaporator 17. Examples of the evaporator temperature sensor 64 include a fin thermistor that detects the temperature of a heat exchange fin in the coolant cooling evaporator 17, a refrigerant temperature sensor that detects the temperature of the refrigerant flowing through the coolant cooling evaporator 17, and the like.

The heater core temperature sensor 65 is a temperature detector that detects the temperature of the heater core 22. Examples of the heater core temperature sensor 65 includes a fin thermistor that detects the temperature of a heat exchange fin in the heater core 22, a coolant temperature sensor that detects the temperature of the coolant flowing through the heater core 22, an air temperature sensor that detects the temperature of the air flowing out of the heater core 22, and the like.

The refrigerant pressure sensor 66 is a refrigerant pressure detector that detects the pressure of the refrigerant discharged from the compressor 11. Instead of the refrigerant pressure sensor 66, the refrigerant temperature sensor may be connected to the input side of the controller 60. The refrigerant temperature sensor is a refrigerant temperature detector that detects the temperature of the refrigerant discharged from the compressor 11. The controller 60 may estimate the pressure of the refrigerant based on the temperature of the refrigerant.

The high-temperature coolant temperature sensor 67 is a temperature detector that detects the temperature of the coolant in the high-temperature coolant circuit 20. For example, the high-temperature coolant temperature sensor 67 detects the temperature of the coolant in the condenser 12.

The low-temperature coolant temperature sensor 68 is a temperature detector that detects the temperature of the coolant in the low-temperature coolant circuit 30. For example, the low-temperature coolant temperature sensor 68 detects the temperature of the coolant in the coolant cooling evaporator 17.

The window surface humidity sensor 69 includes a window vicinity humidity sensor, a window vicinity air temperature sensor, and a window surface temperature sensor.

The window vicinity humidity sensor detects the relative humidity of the air in the vehicle cabin in the vicinity of the windshield inside the vehicle cabin (hereinafter referred to as a window vicinity relative humidity). The window vicinity air temperature sensor detects the temperature of the air in the vehicle cabin in the vicinity of the windshield. The window surface temperature sensor detects the surface temperature of the windshield.

Various operation switches (not shown) are connected to the input side of the controller 60. The respective operation switches are provided at an operation panel 70 and operated by a passenger. The operation panel 70 is disposed near the dashboard at the front of the interior of the vehicle cabin. The controller 60 receives an operation signal input from each of the operation switches.

The various operation switches include an air conditioner switch, a temperature setting switch, and the like. The air conditioner switch sets whether to cool the air in the interior air conditioning unit 50. The temperature setting switch makes setting of the preset temperature of the interior of the vehicle cabin.

Figure 4:
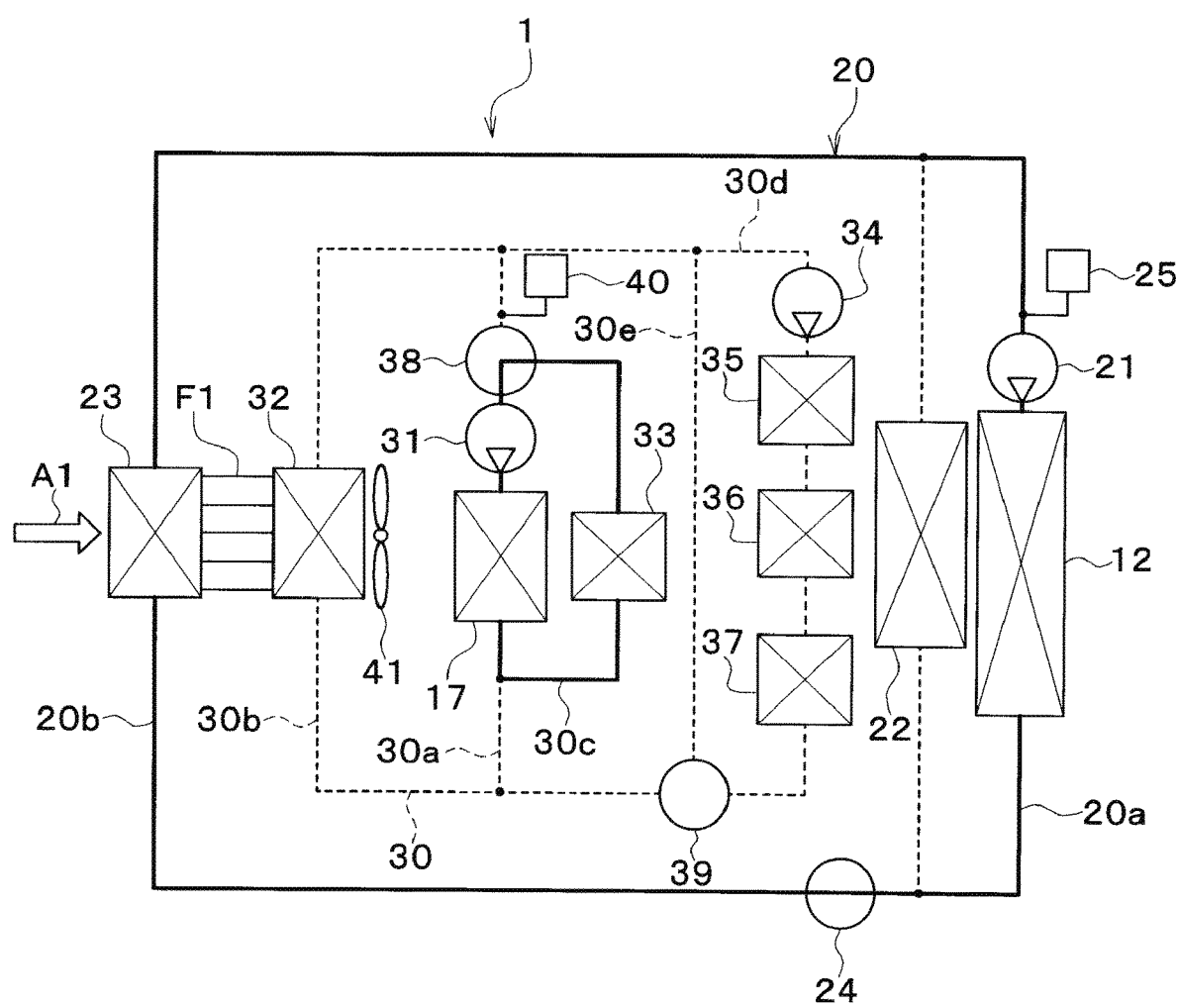
FIG. 4 is a configuration diagram showing the flow of a coolant in a cooling mode of the first embodiment.
Figure 5:
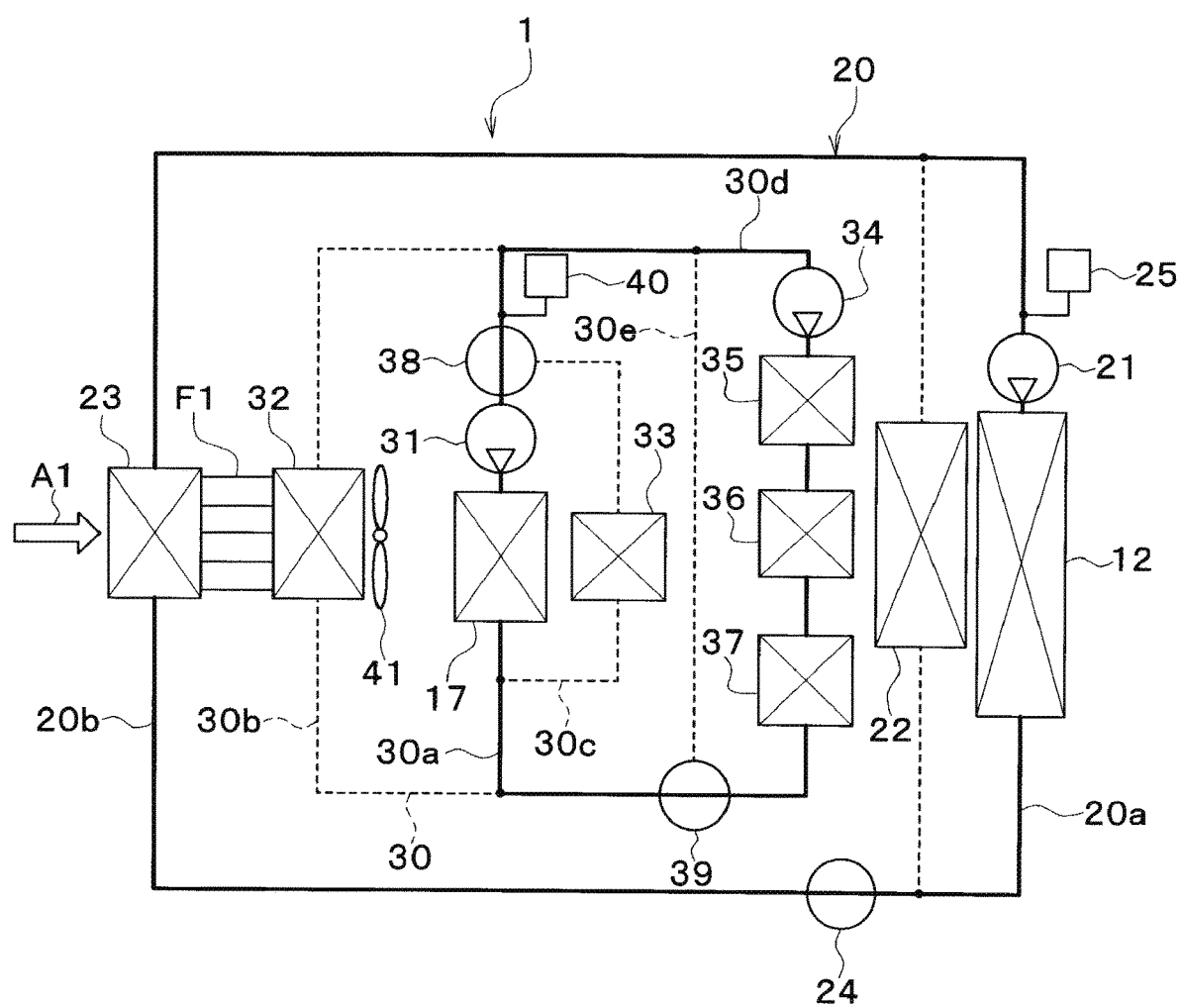
FIG. 5 is a configuration diagram showing another example of the flow of the coolant in the cooling mode of the first embodiment.

Next, the operation of the above-mentioned structure will be described. The controller 60 switches the operation mode of the air conditioner between the cooling mode shown in FIGS. 4 and 5 and the heating mode shown in FIGS. 6 and 7 based on the target air outlet temperature TAO and the like.

The target air outlet temperature TAO is a target temperature of the blowing air to be blown into the vehicle cabin. The controller 60 calculates the target air outlet temperature TAO based on the following equation.

$$TAO = Kset \times Tset - Kr \times Tr - Kam \times Tam - Ks \times Ts + C$$

where Tset is the cabin interior preset temperature that is set by the temperature setting switch on the operation panel 70, Tr is the inside air temperature detected by the inside air temperature sensor 61, Tam is the outside air temperature detected by the outside air temperature sensor 62, and Ts is an amount of solar radiation detected by the solar radiation amount sensor 63. Kset, Kr, Kam, and Ks are control gains, and C is a constant for correction.

When determining that the vehicle window may be fogged in the heating mode, the controller 60 switches the heating mode to a dehumidification heating mode. For example, the controller 60 calculates the relative humidity RHW of the inner surface of the vehicle cabin (hereinafter referred to as a window surface relative humidity) based on a detected value of the window surface humidity sensor 69 in the heating mode. Then, the controller 60 determines the possibility of the fogging of the vehicle window based on the relative humidity RHW of the inner surface of the vehicle cabin.

The window surface relative humidity RHW is an index that indicates the possibility of fogging of the windshield. Specifically, this means that the larger the value of the window surface relative humidity RHW, the higher the possibility of fogging of the windshield.

Next, the operations of the air conditioner in the cooling mode, the heating mode, and the dehumidification heating mode will be described.

(Cooling Mode)

In the cooling mode, the controller 60 brings the first expansion valve 13 into a throttle state and the second expansion valve 16 into a fully closed state.

The controller 60 determines the operating state of each of various control target devices connected to the controller 60 (control signal to be output to each control target device), based on the target air outlet temperature TAO, detection signals from the sensor group, and the like.

A control signal to be output to the first expansion valve 13 is determined such that the superheat degree of the refrigerant flowing into the compressor 11 approaches a target superheat degree previously determined to make a coefficient of performance (so-called COP) of the cycle closer to its maximum value.

A control signal to be output to the servo motor of the air mix door 54 is determined such that the air mix door 54 is located at the position indicated by the solid line in FIG. 1 to close the air passage in the heater core 22, and that the whole ventilation air having passed through the air-cooling evaporator 14 flows while bypassing the air passage in the heater core 22.

In the cooling mode, the compressor 11 and the high-temperature side pump 21 are operated. In the cooling mode, the two-way valve 24 opens the radiator flow passage 20b. Thus, as indicated by the thick line of the high-temperature coolant circuit 20 in FIG. 4, the coolant in the high-temperature coolant circuit 20 circulates through the high-temperature side radiator 23, so that heat is dissipated from the coolant into the outside air in the high-temperature side radiator 23.

Although the coolant in the high-temperature coolant circuit 20 also circulates through the heater core 22 at this time, heat is hardly dissipated from the coolant into the air in the heater core 22 because the air mix door 54 closes the air passage of the heater core 22.

In the refrigeration cycle device 10 during the cooling mode, the refrigerant flows as indicated by the dashed arrow in FIG. 1, so that the state of the refrigerant circulating in the cycle changes as follows.

That is, the high-pressure refrigerant discharged from the compressor 11 flows into the condenser 12. The refrigerant flowing into the condenser 12 dissipates heat into the coolant in the high-temperature coolant circuit 20. Thus, the refrigerant is cooled and condensed in the condenser 12.

The refrigerant flowing out of the condenser 12 flows into the first expansion valve 13 and is then decompressed and expanded in the first expansion valve 13 to become a low-pressure refrigerant. The low-pressure refrigerant decompressed in the first expansion valve 13 flows into the air-cooling evaporator 14 and absorbs heat from the air to be blown into the vehicle cabin to evaporate therein. In this way, the air to be blown into the vehicle cabin is cooled.

The refrigerant flowing out of the air-cooling evaporator 14 flows toward the suction side of the compressor 11 and is then compressed by the compressor 11 again.

As mentioned above, in the cooling mode, the low-pressure refrigerant absorbs heat from the air in the air-cooling evaporator 14, so that the cooled air can be blown out into the vehicle cabin. In this way, cooling of the interior of the vehicle cabin can be achieved.

In the cooling mode, when at least one of the battery 33, the inverter 35, the charger 36, or the motor generator 37 needs to be cooled, the first low-temperature side pump 31 is operated while the second expansion valve 16 is in the throttle state.

Thus, as indicated by the solid arrow in FIG. 1, the refrigerant flowing out of the condenser 12 flows into the second expansion valve 16 and is then decompressed and expanded in the second expansion valve 16 to become a low-pressure refrigerant. The low-pressure refrigerant decompressed in the second expansion valve 16 flows into the coolant cooling evaporator 17 and absorbs heat from the coolant in the low-temperature coolant circuit 30 to evaporate therein. In this way, the coolant in the low-temperature coolant circuit 30 is cooled.

When the battery 33 needs to be cooled, the first three-way valve 38 causes the coolant in the low-temperature side main flow passage 30a to circulate through the battery flow passage 30c. Thus, as indicated by the thick line of the low-temperature coolant circuit 30 in FIG. 4, the coolant in the low-temperature coolant circuit 30 circulates through the battery 33, thereby cooling the battery 33.

When the inverter 35, the charger 36, and the motor generator 37 need to be cooled, the second three-way valve 39 causes the coolant in the low-temperature side main flow passage 30a to circulate through the device flow passage 30d. Thus, as indicated by the thick line corresponding to the low-temperature coolant circuit 30 in FIG. 5, the coolant in the low-temperature coolant circuit 30 circulates through the inverter 35, the charger 36, and the motor generator 37, so that the inverter 35, the charger 36, and the motor generator 37 are cooled.

(Heating Mode)

In the heating mode, the controller 60 brings the first expansion valve 13 into the fully closed state and the second expansion valve 16 into the throttle state.

The controller 60 determines the operating state of each of various control target devices connected to the controller 60 (control signal to be output to each control target device), based on the target air outlet temperature TAO, detection signals from the sensor group, and the like.

A control signal to be output to the second expansion valve 16 is determined such that the superheat degree of the refrigerant flowing into the second expansion valve 16 approaches a target superheat degree previously determined. The target superheat degree is determined such that the coefficient of performance (so-called COP) of the cycle is made closer to its maximum value.

A control signal to be output to the servo motor of the air mix door 54 is determined such that the air mix door 54 is located at the position indicated by the dashed line in FIG. 1 to fully open the air passage in the heater core 22, and that the whole ventilation air having passed through the air-cooling evaporator 14 passes through the air passage of the heater core 22.

In the heating mode, the compressor 11, the high-temperature side pump 21, and the first low-temperature side pump 31 are operated. In the heating mode, the two-way valve 24 closes the radiator flow passage 20b. Thus, as indicated by the thick line of the high-temperature coolant circuit 20 in FIG. 6, the coolant in the high-temperature coolant circuit 20 circulates through the heater core 22, so that the heat of the coolant in the heater core 22 is dissipated into the air to be blown into the vehicle cabin.

In the heating mode, the first three-way valve 38 closes the battery flow passage 30c, whereas the second three-way valve 39 closes the device flow passage 30d and the bypass flow passage 30e. Thus, the coolant in the low-temperature coolant circuit 30 circulates through the low-temperature side radiator 32 as indicated by the thick line of the low-temperature coolant circuit 30 in FIG. 6.

In the refrigeration cycle device 10 during the heating mode, the refrigerant flows as indicated by the solid arrow in FIG. 1, so that the state of the refrigerant circulating in the cycle changes as follows.

That is, the high-pressure refrigerant discharged from the compressor 11 flows into the condenser 12 and exchanges heat with the coolant in the high-temperature coolant circuit 20, thereby dissipating heat into the coolant. In this way, the coolant in the high-temperature coolant circuit 20 is heated.

The refrigerant flowing out of the condenser 12 flows into the second expansion valve 16 and is decompressed into a low-pressure refrigerant. The low-pressure refrigerant decompressed in the second expansion valve 16 flows into the coolant cooling evaporator 17 and absorbs heat from the coolant in the low-temperature coolant circuit 30 to evaporate therein.

The refrigerant flowing out of the coolant cooling evaporator 17 flows toward the suction side of the compressor 11 and is then compressed by the compressor 11 again.

As mentioned above, in the heating mode, the heat included in the high-pressure refrigerant discharged from the compressor 11 is dissipated by the condenser 12 into the coolant in the high-temperature coolant circuit 20. Then, the heat of the coolant in the high-temperature coolant circuit 20 is further dissipated by the heater core 22 into the air. Consequently, the air heated by the heater core 22 can be blown into the vehicle cabin. In this way, heating of the interior of the vehicle cabin can be achieved.

The coolant in the low-temperature coolant circuit 30 circulates through the low-temperature side radiator 32, so that the heat from the outside air can be absorbed into the coolant in the low-temperature coolant circuit 30, and then the heat from the coolant in the low-temperature coolant circuit 30 can be absorbed into the low-pressure refrigerant by the coolant cooling evaporator 17. Therefore, the heat of the outside air can be utilized for heating of the interior of the vehicle cabin.

Figure 7:
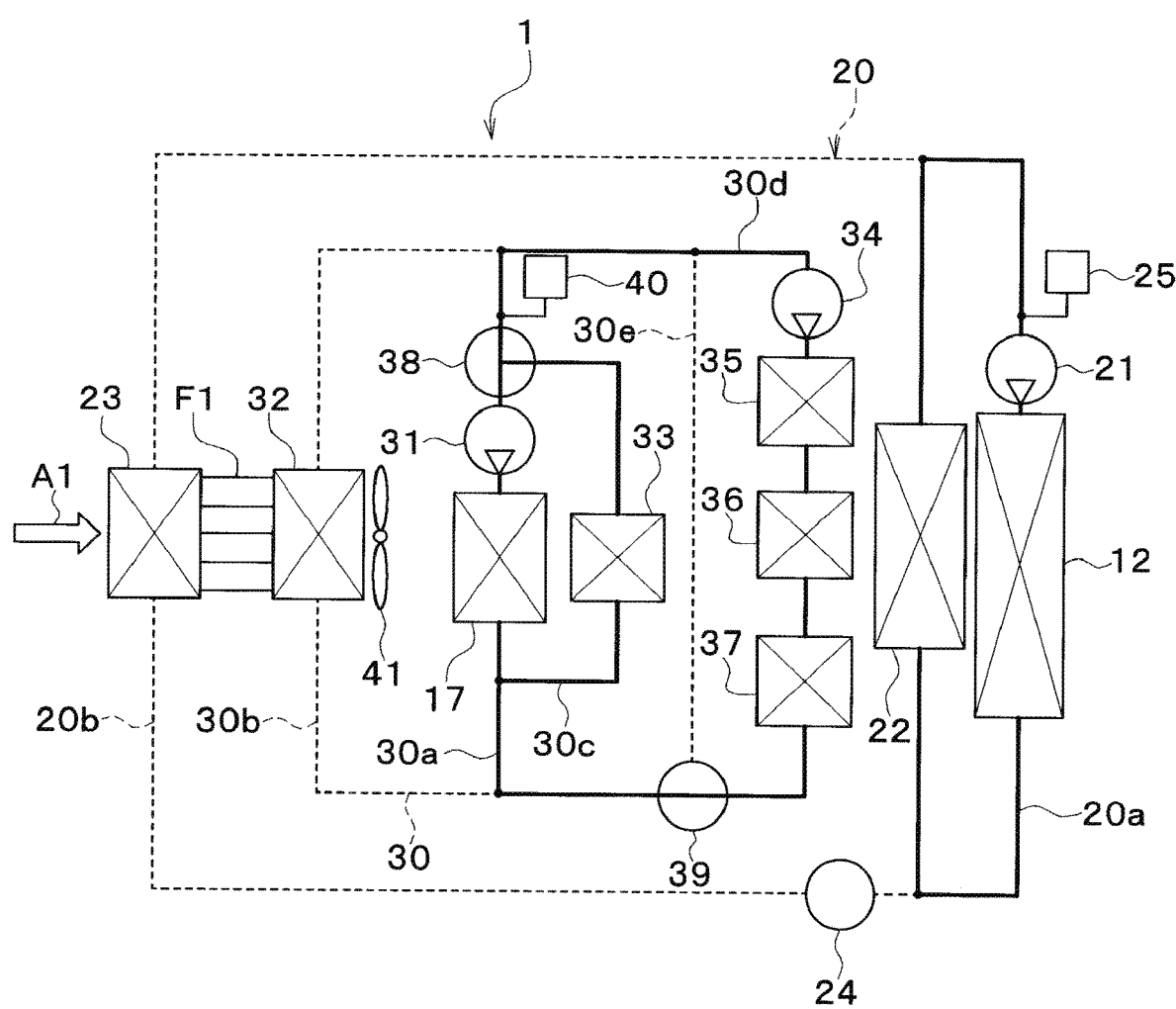
FIG. 7 is a configuration diagram showing another example of the flow of the coolant in the heating mode of the first embodiment.

In the heating mode, as indicated by the thick line of the low-temperature coolant circuit 30 in FIG. 7, also by causing the coolant in the low-temperature coolant circuit 30 to circulate through the battery 33, the inverter 35, the charger 36, and the motor generator 37, waste heat from the battery 33, the inverter 35, the charger 36, and the motor generator 37 can be absorbed into the coolant in the low-temperature coolant circuit 30. Consequently, the heat of the coolant in the low-temperature coolant circuit 30 can be then absorbed into the low-pressure refrigerant in the coolant cooling evaporator 17.

Therefore, the waste heat from the battery 33, the inverter 35, the charger 36, and the motor generator 37 can be utilized for heating the interior of the vehicle cabin. The waste heat from the battery 33, the inverter 35, the charger 36, and the motor generator 37 can also be utilized for defrosting the low-temperature side radiator 32.

It is noted that the coolant in the low-temperature coolant circuit 30 also circulates through at least one of the battery 33, the inverter 35, the charger 36, or the motor generator 37, so that the waste heat from at least one of the battery 33, the inverter 35, the charger 36, or the motor generator 37 can be utilized for heating and defrosting the interior of the vehicle cabin.

(Defrosting After Heating Mode)

In the heating mode, the coolant in the low-temperature coolant circuit 30 absorbs heat from the outside air in the low-temperature side radiator 32, causing frost formation at the low-temperature side radiator 32. Therefore, when the vehicle stops after the execution of the heating mode, the low-temperature side radiator 32 is defrosted by using heat remaining in the coolant of the high-temperature coolant circuit 20.

That is, since the high-temperature side radiator 23 and the low-temperature side radiator 32 are connected to each other by the common fin F1 so as to be able to transfer heat therebetween, the heat of the coolant in the high-temperature coolant circuit 20 is transferred from the high-temperature side radiator 23 to the low-temperature side radiator 32.

Thus, the temperature of the low-temperature side radiator 32 is raised, enabling the frost formed at the surface of the low-temperature side radiator 32 to be melted.

(Dehumidification Heating Mode)

In the dehumidification heating mode, the controller 60 brings the first expansion valve 13 into a throttle state and the second expansion valve 16 into a throttle state or the fully closed state.

The controller 60 determines the operating state of each of various control target devices connected to the controller 60 (control signal to be output to each control target device), based on the target air outlet temperature TAO, detection signals from the sensor group, and the like.

A control signal to be output to the first expansion valve 13 is determined such that the superheat degree of the refrigerant flowing into the first expansion valve 13 approaches a target superheat degree previously determined. The target superheat degree is determined such that the coefficient of performance (so-called COP) of the cycle is made closer to its maximum value.

A control signal to be output to the servo motor of the air mix door 54 is determined such that the air mix door 54 fully opens the air passage in the heater core 22, and that the whole ventilation air having passed through the air-cooling evaporator 14 passes through the air passage in the heater core 22.

In the dehumidification heating mode, the compressor 11, the high-temperature side pump 21, and the first low-temperature side pump 31 are operated.

In the dehumidification heating mode, the two-way valve 24 closes the radiator flow passage 20b. Thus, as indicated by the thick line of the high-temperature coolant circuit 20 in FIG. 6, the coolant in the high-temperature coolant circuit 20 circulates through the heater core 22, so that the heat of the coolant in the heater core 22 is dissipated into the air to be blown into the vehicle cabin.

In the refrigeration cycle device 10 during the dehumidification heating mode, the refrigerant flows as indicated by the dashed arrow in FIG. 1, so that the state of the refrigerant circulating in the cycle changes as follows.

That is, the high-pressure refrigerant discharged from the compressor 11 flows into the condenser 12 and exchanges heat with the coolant in the high-temperature coolant circuit 20, thereby dissipating heat into the coolant. In this way, the coolant in the high-temperature coolant circuit 20 is heated.

The refrigerant flowing out of the condenser 12 flows into the first expansion valve 13 and is decompressed into the low-pressure refrigerant. The low-pressure refrigerant decompressed in the first expansion valve 13 flows into the air-cooling evaporator 14 and absorbs heat from the air to be blown into the vehicle cabin to evaporate therein. In this way, the air blown toward the interior of the vehicle cabin is cooled and dehumidified. The refrigerant flowing out of the air-cooling evaporator 14 flows toward the suction side of the compressor 11 and is then compressed by the compressor 11 again.

As mentioned above, in the dehumidification heating mode, the heat included in the high-pressure refrigerant discharged from the compressor 11 is dissipated by the condenser 12 into the coolant in the high-temperature coolant circuit 20. Then, the heat included in the coolant of the high-temperature coolant circuit 20 is further dissipated by the heater core 22 into the air.

The low-pressure refrigerant decompressed in the first expansion valve 13 absorbs heat from the air to be blown into the vehicle cabin in the air-cooling evaporator 14, so that the air cooled and dehumidified in the air-cooling evaporator 14 can be then heated in the heater core 22 and blown into the vehicle cabin. In this way, the dehumidifying and heating of the interior of the vehicle cabin can be achieved.

Furthermore, in the dehumidification heating mode, by bringing the second expansion valve 16 into the throttle state, the low-pressure refrigerant decompressed in the second expansion valve 16 can flow into the coolant cooling evaporator 17 and can absorb heat from the coolant in the low-temperature coolant circuit 30 to evaporate therein.

Figure 6:
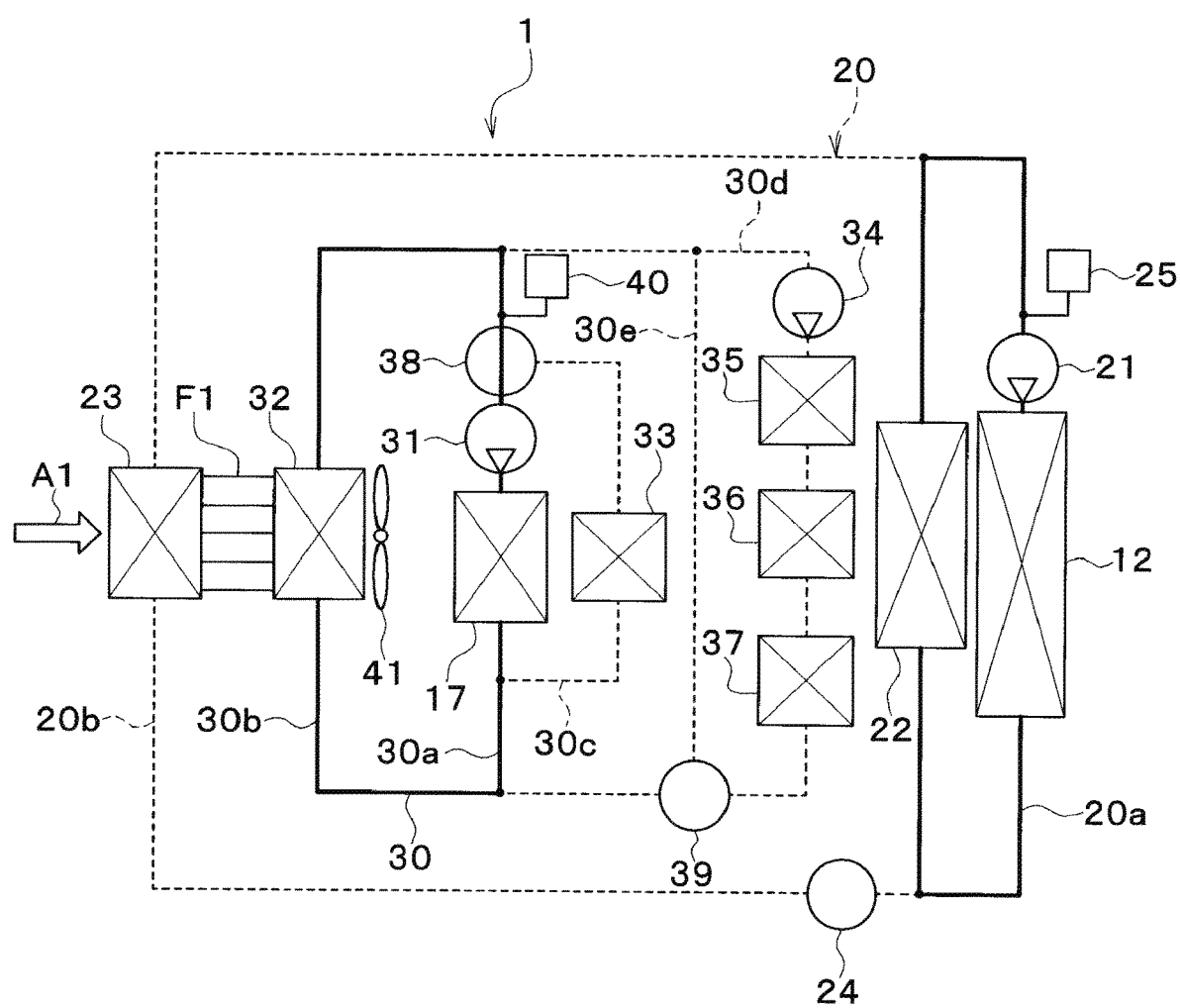
FIG. 6 is a configuration diagram showing the flow of a coolant in a heating mode of the first embodiment.

As indicated by the thick line of the low-temperature coolant circuit 30 in FIG. 6, the coolant in the low-temperature coolant circuit 30 circulates through the low-temperature side radiator 32, so that the heat from the outside air can be absorbed into the coolant in the low-temperature coolant circuit 30, and then the heat from the coolant in the low-temperature coolant circuit 30 can be absorbed into the low-pressure refrigerant by the coolant cooling evaporator 17. Therefore, the heat of the outside air can be utilized for heating of the interior of the vehicle cabin.

As indicated by the thick line of the low-temperature coolant circuit 30 in FIG. 7, the coolant cooled in the coolant cooling evaporator 17 also circulates through the battery 33, the inverter 35, the charger 36, and the motor generator 37. Thus, waste heat from the battery 33, the inverter 35, the charger 36, and the motor generator 37 can be absorbed into the coolant in the low-temperature coolant circuit 30. Consequently, the heat of the coolant in the low-temperature coolant circuit 30 can be then absorbed into the low-pressure refrigerant in the coolant cooling evaporator 17. Therefore, the waste heat from the battery 33, the inverter 35, the charger 36, and the motor generator 37 can be utilized for heating the interior of the vehicle cabin.

In this way, the vehicle air conditioner 1 of the present embodiment switches the refrigerant flow between the air-cooling evaporator 14 and the coolant cooling evaporator 17 and also switches the coolant flow in each of the high-temperature coolant circuit 20 and the low-temperature coolant circuit 30. Consequently, the appropriate cooling, heating, and dehumidification heating can be executed on the interior of the vehicle cabin, thereby achieving comfortable air conditioning of the interior of the vehicle cabin.

Figure 8:
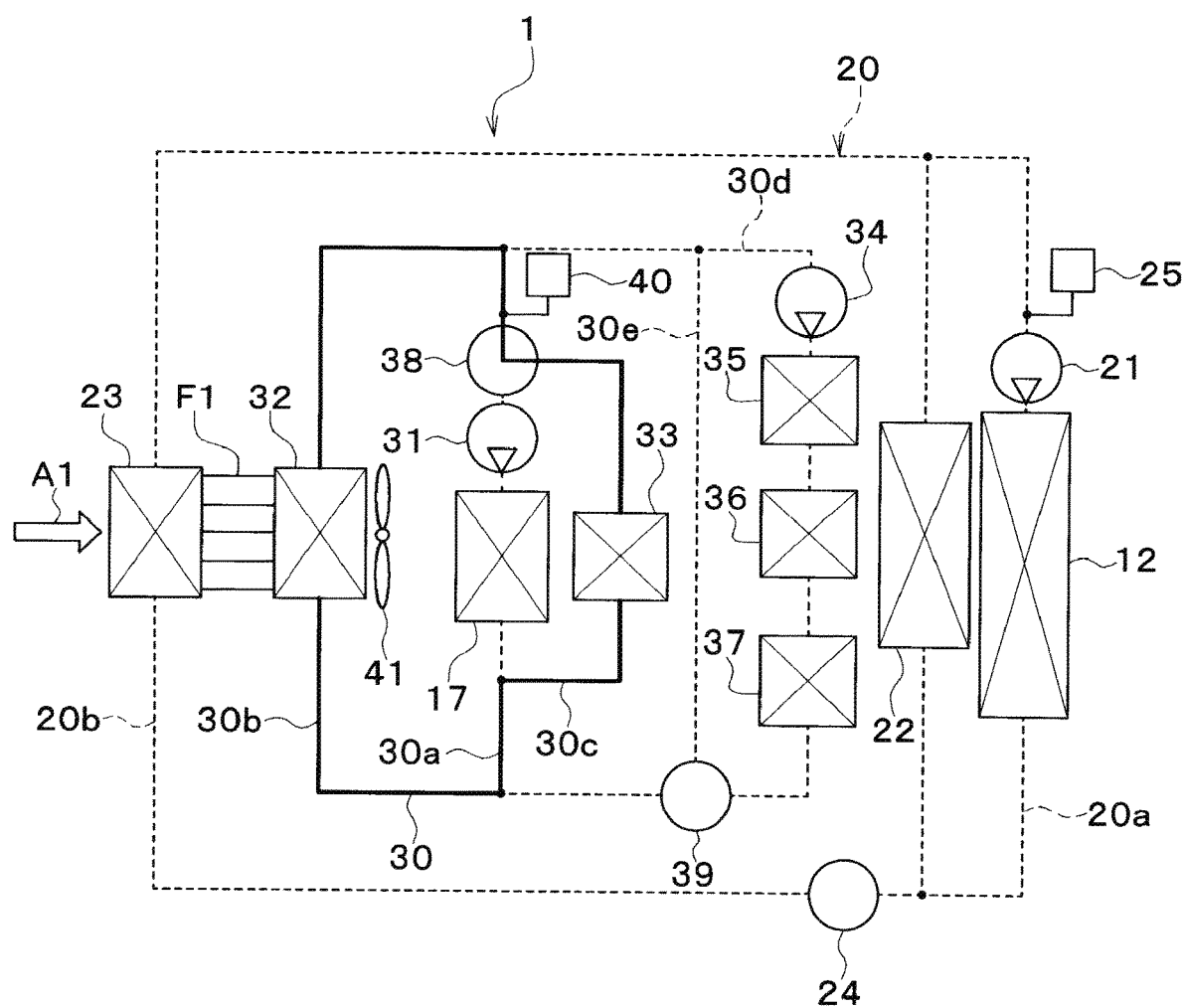
FIG. 8 is a configuration diagram showing an example of the flow of the coolant in a battery cooling operation of the first embodiment.

When the battery 33 does not need to be cooled to a temperature below the outside air temperature, or when the refrigerant does not circulate through the coolant cooling evaporator 17 even though the battery 33 needs to be cooled, as shown in FIG. 8, the controller 60 controls the first three-way valve 38 such that the coolant in the low-temperature coolant circuit 30 circulates between the low-temperature side radiator 32 and the battery 33. Thus, the waste heat from the battery 33 can be dissipated into the outside air, thereby cooling the battery 33.

Figure 9:
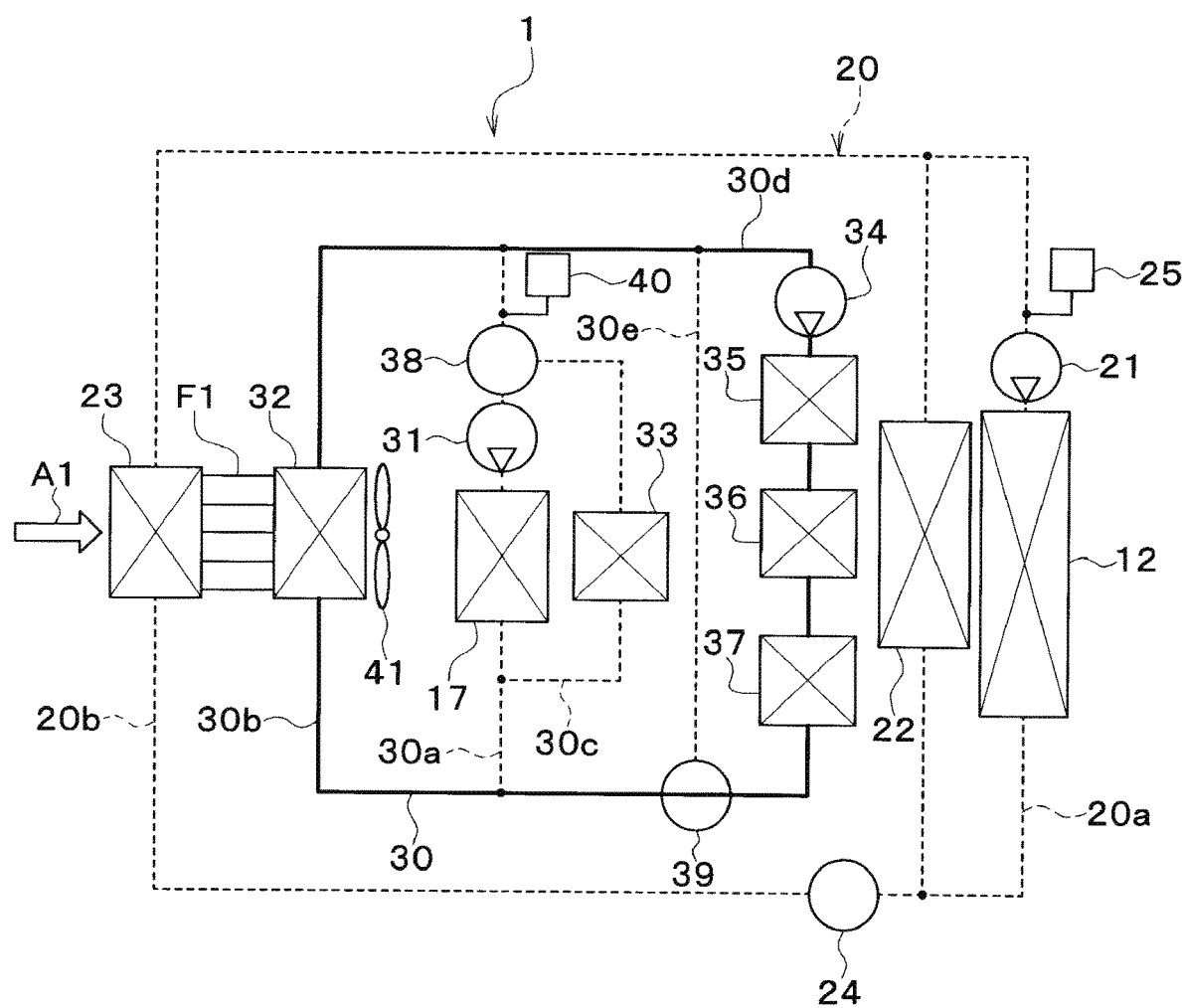
FIG. 9 is a configuration diagram showing another example of the flow of the coolant in the battery cooling operation of the first embodiment.

When the inverter 35, the charger 36, and the motor generator 37 do not need to be cooled to a temperature below the outside air temperature, or when the refrigerant does not circulate through the coolant cooling evaporator 17 even though the battery 33 needs to be cooled, as shown in FIG. 9, the controller 60 controls the second three-way valve 39 such that the coolant in the low-temperature coolant circuit 30 circulates between the low-temperature side radiator 32 and each of the inverter 35, the charger 36, and the motor generator 37. Thus, the waste heat from the inverter 35, the charger 36, and the motor generator 37 can be dissipated into the outside air, thereby cooling the inverter 35, the charger 36, and the motor generator 37.

In the present embodiment, the air conditioner executes the cooling mode in which the two-way valve 24 causes the coolant in the high-temperature coolant circuit 20 to circulate between the condenser 12 and the high-temperature side radiator 23 in a state where the refrigerant circulates through the air-cooling evaporator 14.

The air conditioner executes the heating mode in which the two-way valve 24 causes the coolant in the high-temperature coolant circuit 20 to circulate between the condenser 12 and the heater core 22, and the first three-way valve 38 and the second three-way valve 39 cause the coolant in the low-temperature coolant circuit 30 to circulate between the coolant cooling evaporator 17 and the low-temperature side radiator 32, in a state where the refrigerant circulates through the coolant cooling evaporator 17.

Thus, the air conditioner can be switched between the heating mode and the cooling mode by switching the flow of the coolant in the high-temperature coolant circuit 20 and the flow of the low-temperature coolant in the low-temperature coolant circuit 30.

Because of this, the switching between the high and low pressures of the cycle is not necessary for the heat exchanger, unlike the prior art, making it possible to simplify the circuit configuration and the switching control of the air conditioner.

In the present embodiment, the low-temperature side radiator 32 and the high-temperature side radiator 23 have the common fin F1 for promoting the heat exchange therebetween and thus are thermally connected together by the common fin F1.

Thus, when the air conditioning operation is stopped after the heating mode, the heat included in the coolant within the high-temperature coolant circuit 20 can be transferred from the high-temperature side radiator 23 to the low-temperature side radiator 32, thereby defrosting the low-temperature side radiator 32.

In the present embodiment, the air conditioner of the present embodiment includes the first expansion valve 13 and the second expansion valve 16 for the air-cooling evaporator 14 and the coolant-cooling evaporator 17, respectively. The first expansion valve 13 switches a state in which the refrigerant circulates through the air-cooling evaporator 14 and a state in which the refrigerant does not circulate therethrough. The second expansion valve 16 switches a state in which the refrigerant circulates through the coolant-cooling evaporator 17 and a state in which the refrigerant does not circulate therethrough.

Thus, these expansion valves can switch whether the air is cooled by the air-cooling evaporator 14 and whether the coolant in the low-temperature coolant circuit 30 is cooled by the coolant cooling evaporator 17.

In the present embodiment, the second expansion valve 16 causes the refrigerant to circulate through the coolant cooling evaporator 17 if the capacity of the heater core 22 to heat the air is insufficient when the air conditioner executes the dehumidification heating mode in which the two-way valve 24 causes the high-temperature heat medium to circulate between the condenser 12 and the heater core 22, while the first expansion valve 13 causes the refrigerant to circulate to the air-cooling evaporator 14.

Thus, when the capacity of the heater core 22 to heat the air is insufficient in the dehumidification heating mode, the heat from the coolant in the low-temperature coolant circuit 30 is absorbed in the coolant cooling evaporator 17, making it possible to compensate for the air heating capacity.

In the present embodiment, the first three-way valve 38 and the second three-way valve 39 switch between the state of causing the coolant in the low-temperature coolant circuit 30 to circulate between the coolant cooling evaporator 17 and each of the battery 33, the inverter 35, the charger 36, and the motor generator 37, and the state of causing the coolant in the low-temperature coolant circuit 30 to circulate between the coolant cooling evaporator 17 and the low-temperature side radiator 32.

Thus, the air conditioner can switch between the operation of absorbing the waste heat from the battery 33, inverter 35, charger 36, and motor generator 37 into the coolant in the low-temperature coolant circuit 30 and the operation of absorbing the heat of the outside air around the battery 33, the inverter 35, the charger 36, and the motor generator 37 into the coolant in the low-temperature coolant circuit 30.

In the present embodiment, when the refrigerant circulates through the coolant cooling evaporator 17, the first three-way valve 38 and the second three-way valve 39 causes the coolant in the low-temperature coolant circuit 30 to circulate between the coolant cooling evaporator 17 and at least one of the battery 33, the inverter 35, the charger 36, the motor generator 37, or the low-temperature side radiator 32.

Thus, at least one of the waste heat from the battery 33, the inverter 35, the charger 36, or the motor generator 37 or the heat of the outside air can be absorbed in and utilized by the coolant cooling evaporator 17.

In addition, since the coolant cooled in the coolant cooling evaporator 17 circulates through the low-temperature coolant circuit 30, the coolant in the low-temperature coolant circuit 30 can absorb heat of the outside air in pipes and the like of the low-temperature coolant circuit 30.

In the present embodiment, the first three-way valve 38 and the second three-way valve 39 switch to a state where the coolant in the low-temperature coolant circuit 30 circulates between the low-temperature side radiator 32 and the battery 33.

Thus, when the battery 33 does not need to be cooled to a temperature below the outside air temperature, the waste heat from the battery 33 can be dissipated into the outside air, thereby cooling the battery 33.

The first three-way valve 38 and the second three-way valve 39 switch to a state where the coolant in the low-temperature coolant circuit 30 circulates between the low-temperature side radiator 32 and each of the inverter 35, the charger 36, and the motor generator 37.

Thus, when the inverter 35, the charger 36, and the motor generator 37 do not need to be cooled to a temperature below the outside air temperature, the waste heat from the inverter 35, the charger 36, and the motor generator 37 can be dissipated into the outside air, thereby cooling the inverter 35, the charger 36, and the motor generator 37.

In the present embodiment, the coolant cooling evaporator 17 and the air-cooling evaporator 14 are arranged in parallel with each other in the flow of the refrigerant. The first expansion valve 13 decompresses the refrigerant flowing into the coolant cooling evaporator 17, whereas the second expansion valve 16 decompresses the refrigerant flowing into the air-cooling evaporator 14.

A low-pressure valve (pressure adjustment portion) 15 adjusts the outlet-side refrigerant pressure of the air-cooling evaporator 14 to be equal to or higher than the outlet-side refrigerant pressure of the coolant cooling evaporator 17.

Thus, when the refrigerant flows to both the coolant cooling evaporator 17 and the air-cooling evaporator 14, the backflow of the refrigerant toward the air-cooling evaporator 14 can be prevented.

Second Embodiment

Figure 10:
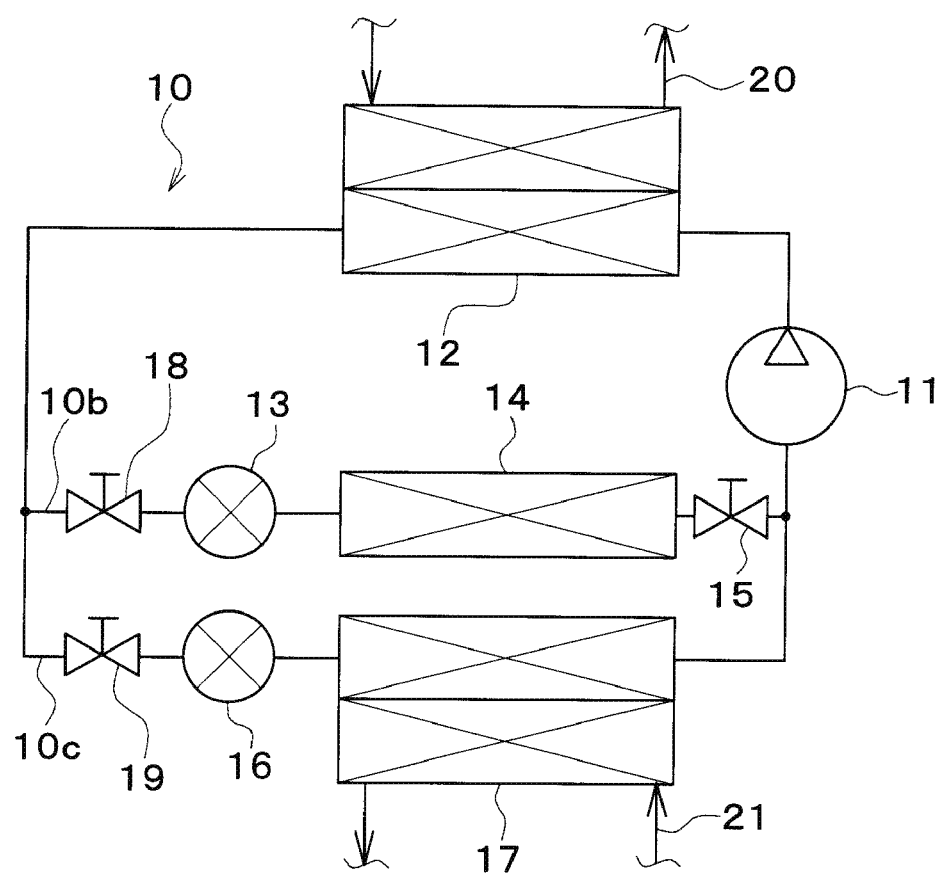
FIG. 10 is a configuration diagram of a refrigeration cycle of an air conditioner in a second embodiment.

In the above-mentioned embodiment, the first expansion valve 13 and the second expansion valve 16 are electric variable throttle mechanisms with the fully closing function. On the other hand, in the present embodiment, as shown in FIG. 10, the first expansion valve 13 and the second expansion valve 16 are mechanical thermal expansion valves; a first on-off valve 18 is disposed in the first parallel refrigerant flow passage 10$b$; and a second on-off valve 19 is disposed in the second parallel refrigerant flow passage 10$c$.

The mechanical expansion valve is a thermal expansion valve that has a thermal-sensitive portion and drives a valve body by a mechanical mechanism, such as a diaphragm.

The first on-off valve 18 is a solenoid valve that opens and closes the first parallel refrigerant flow passage 10$b$. The second on-off valve 19 is a solenoid valve that opens and closes the second parallel refrigerant flow passage 10$c$. The operations of the first on-off valve 18 and the second on-off valve 19 are controlled by a control signal(s) output from the controller 60.

Although in the above-mentioned embodiment, the constant pressure valve 15 is a mechanical variable throttle mechanism, in the present embodiment, the constant pressure valve 15 is an electric variable throttle mechanism, and the operation of the constant pressure valve 15 is controlled by a control signal output from the controller 60.

The present embodiment can also exhibit the same operations and effects as those in the above-mentioned embodiment.

Third Embodiment

Figure 11:
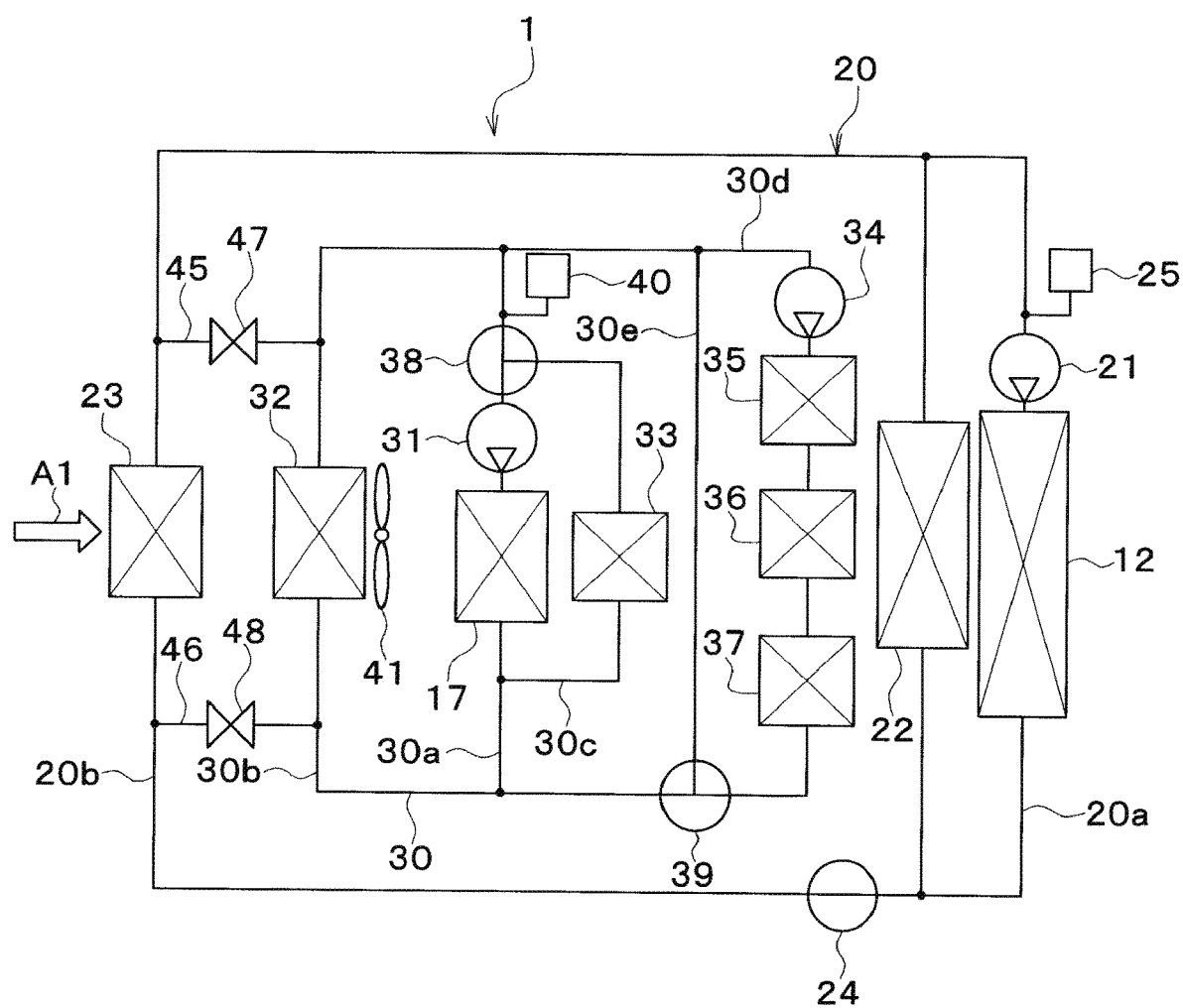
FIG. 11 is a configuration diagram of a coolant circuit of an air conditioner in a third embodiment.

In the above-mentioned embodiment, the high-temperature side radiator 23 and the low-temperature side radiator 32 are connected to each other by the common fin F1 so as to be able to transfer heat therebetween. However, in the present embodiment, as shown in FIG. 11, the high-temperature side radiator 23 and the low-temperature side radiator 32 are capable of transferring heat therebetween via the coolant.

The radiator flow passage 20$b$ and the low-temperature side radiator flow passage 30$b$ communicate with each other by two coolant flow passages 45 and 46. The two coolant flow passages 45 and 46 cause the high-temperature side radiator 23 and the low-temperature side radiator 32 to communicate with each other at their inlets and outlets for the coolant, respectively.

An on-off valve 47 is disposed in one coolant flow passage 45. An on-off valve 48 is disposed in the other coolant flow passage 46. The on-off valve 47 is a solenoid valve that opens and closes the one coolant flow passage 45. The other on-off valve 48 is a solenoid valve that opens and closes the other coolant flow passage 46. The operations of the on-off valves 47 and 48 are controlled by the controller 60.

The controller 60 normally controls the on-off valves 47 and 48 to close the coolant flow passages 45 and 46.

The controller 60 controls the on-off valves 47 and 48 to open the coolant flow passages 45 and 46 when the vehicle stops after the execution of the heating mode. Thus, since the coolant in the high-temperature coolant circuit 20 is introduced into the low-temperature side radiator 32, the heat remaining in the coolant of the high-temperature coolant circuit 20 can be used to raise the temperature of the low-temperature side radiator 32, thus melting frost formed at the surface of the low-temperature side radiator 32.

Other Embodiments

Various modifications and changes can be made to the above-mentioned embodiments, for example, in the following ways.

(1) Although in the above-mentioned embodiments, the coolant is used as the heat medium, various kinds of media, such as oil, may be used as the heat medium.

Alternatively, a nanofluid may be used as the heat medium. The nanofluid is a fluid that contains nanoparticles having a diameter of the order of nanometer. By mixing the nanoparticles into the heat medium, the following functions and effects of the mixture can be obtained, in addition to the function and effect of decreasing a freezing point of the heat medium, like a coolant using ethylene glycol to transform the heat medium into an antifreezing fluid.

That is, the use of the nanoparticles in the heat medium can exhibit the functions and effects of improving the thermal conductivity of the heat medium in a specific temperature range, increasing the thermal capacity of the heat medium, preventing the corrosion of a metal pipe and the deterioration of a rubber pipe, and enhancing the fluidity of the heat medium at an ultralow temperature.

These functions and effects are varied depending on the configuration, shape, and blending ratio of the nanoparticles, and additive material thereto.

Thus, the mixture of nanoparticles in the heat medium can improve its thermal conductivity, and even in a small amount, can exhibit substantially the same cooling efficiency, compared with the coolant using ethylene glycol.

Since the thermal capacity of the heat medium can be increased, a cold heat storage amount due to the sensible heat of the heat medium itself can be increased.

By increasing the cold heat storage amount, the temperature adjustment, including cooling and heating, of the device can be performed using the cold heat storage for some period of time, even though the compressor 11 is not operated, thereby saving the power of a vehicle thermal management device.

An aspect ratio of the nanoparticle is preferably 50 or more. This is because such an aspect ratio can achieve the adequate thermal conductivity. Note that the aspect ratio of the nanoparticle is a shape index indicating the ratio of the width to the height of the nanoparticle.

Nanoparticles suitable for use include any one of Au, Ag, Cu, and C. Specifically, examples of constituent atoms of the nanoparticles can include Au nanoparticles, an Ag nanowire, a carbon nanotube (CNT), a graphene, graphite core-shell nanoparticles, an Au nanoparticle-containing CNT, and the like.

A CNT is a carbon nanotube. The graphite core-shell nanoparticle is a particle body with the above-mentioned atom surrounded by a structure, such as a carbon nanotube.

(2) In the refrigeration cycle device 10 of the above-mentioned embodiments, fluorocarbon refrigerant is used as the refrigerant. However, the kind of refrigerant is not limited thereto. Natural refrigerant, such as carbon dioxide, a hydrocarbon refrigerant, and the like may be used.

The refrigeration cycle device 10 of the above-mentioned embodiments constitutes a subcritical refrigeration cycle in which its high-pressure side refrigerant pressure does not exceed the critical pressure of the refrigerant, but may constitute a super-critical refrigeration cycle in which its high-pressure side refrigerant pressure exceeds the critical pressure of the refrigerant.

(3) In the above-mentioned embodiments, the high-temperature side radiator 23 and the low-temperature side radiator 32 are separate radiators, but joined together by the common fin F1. However, the high-temperature side radiator 23 and the low-temperature side radiator 32 may be constituted of one radiator.

For example, the high-temperature side radiator 23 and the low-temperature side radiator 32 may be constituted of one radiator by integrating the tank of the high-temperature side radiator 23 and the tank of the low-temperature side radiator 32 with each other.

What is claimed is:

1. An air conditioner comprising:
  a compressor configured to draw, compress, and discharge a refrigerant;
  a high-pressure side refrigerant-heat medium heat exchanger configured to exchange heat between the refrigerant discharged from the compressor and a high-temperature heat medium;
  an air-heating heat exchanger configured to exchange heat between the high-temperature heat medium heat-exchanged in the high-pressure side refrigerant-heat medium heat exchanger and air which is to be blown into a space to be air-conditioned;
  a high-temperature heat medium-outside air heat exchanger configured to exchange heat between the high-temperature heat medium and outside air;
  a high-temperature heat medium circuit in which the high-temperature heat medium circulates to the high-pressure side refrigerant-heat medium heat exchanger, the air-heating heat exchanger, and the high-temperature heat medium-outside air heat exchanger;
  a decompression portion configured to decompress the refrigerant heat-exchanged in the high-pressure side refrigerant-heat medium heat exchanger;
  a low-pressure side refrigerant-heat medium heat exchanger configured to exchange heat between the refrigerant decompressed by the decompression portion and a low-temperature heat medium;
  an air-cooling heat exchanger configured to exchange heat between the refrigerant decompressed by the decompression portion and the air;
  a heat generating device configured to generate heat during an operation and to be cooled by the low-temperature heat medium;
  a low-temperature heat medium-outside air heat exchanger configured to exchange heat between the low-temperature heat medium and the outside air;
  a low-temperature heat medium circuit in which the low-temperature heat medium circulates to the low-pressure side refrigerant-heat medium heat exchanger, the heat generating device, and the low-temperature heat medium-outside air heat exchanger;
  a high-temperature switching portion configured to switch a flow of the high-temperature heat medium in the high-temperature heat medium circuit; and
  a low-temperature switching portion configured to switch a flow of the low-temperature heat medium in the low-temperature heat medium circuit, wherein
  the air conditioner executes a cooling mode in which the high-temperature switching portion causes the high-temperature heat medium to circulate between the high-pressure side refrigerant-heat medium heat exchanger and the high-temperature heat medium-outside air heat exchanger in a state where the refrigerant circulates in the air-cooling heat exchanger,
  the air conditioner executes a heating mode in which the high-temperature switching portion causes the high-temperature heat medium to circulate between the high-pressure side refrigerant-heat medium heat exchanger and the air-heating heat exchanger, while the low-temperature switching portion causes the low-temperature heat medium to circulate between the low-pressure side refrigerant-heat medium heat exchanger and the low-temperature heat medium-outside air heat exchanger, in a state where the refrigerant circulates in the low-pressure side refrigerant-heat medium heat exchanger, and
  the low-temperature heat medium-outside air heat exchanger and the high-temperature heat medium-outside air heat exchanger have a common heat exchange member configured to promote heat exchange therebetween, and are thermally connected to each other by the common heat exchange member to transmit heat between the high-temperature heat medium circuit and the low-temperature heat medium circuit.

2. The air conditioner according to claim 1, further comprising
  a refrigerant flow switching portion configured to switch between a state in which the refrigerant circulates and a state in which the refrigerant does not circulate, with respect to each of the low-pressure side refrigerant-heat medium heat exchanger and the air-cooling heat exchanger.

3. The air conditioner according to claim 2, wherein
  the air conditioner executes, in addition to the cooling mode and the heating mode, a dehumidification heating mode in which the high-temperature switching portion causes the high-temperature heat medium to circulate between the high-pressure side refrigerant-heat medium heat exchanger and the air-heating heat exchanger, while the refrigerant flow switching portion causes the refrigerant to circulate through the air-cooling heat exchanger, and
  the refrigerant flow switching portion causes the refrigerant to circulate through the low-pressure side refrigerant-heat medium heat exchanger if a capacity of the air-heating heat exchanger to heat the air is lower than a predetermined value when the dehumidification heating mode is executed.

4. The air conditioner according to claim 1, further comprising
a heat medium flow switching portion configured to switch a state in which the low-temperature heat medium circulates between the low-pressure side refrigerant-heat medium heat exchanger and the heat generating device and a state in which the low-temperature heat medium circulates between the low-pressure side refrigerant-heat medium heat exchanger and the low-temperature heat medium-outside air heat exchanger.

5. The air conditioner according to claim 4, wherein
the heat medium flow switching portion causes the low-temperature heat medium to circulate between the low-pressure side refrigerant-heat medium heat exchanger and at least one of the heat generating device or the low-temperature heat medium-outside air heat exchanger when the refrigerant circulates through the low-pressure side refrigerant-heat medium heat exchanger.

6. The air conditioner according to claim 1, further comprising a heat medium flow switching portion configured to switch to a state in which the low-temperature heat medium circulates between the low-temperature heat medium-outside air heat exchanger and the heat generating device.

7. The air conditioner according to claim 1, wherein
the low-pressure side refrigerant-heat medium heat exchanger and the air-cooling heat exchanger are arranged in parallel with each other in a flow of the refrigerant, and
the decompression portion includes a first decompression valve configured to decompress the refrigerant flowing into the air-cooling heat exchanger and a second decompression portion configured to decompress the refrigerant flowing into the low-pressure side refrigerant-heat medium heat exchanger, the air conditioner further comprising
a pressure adjustment portion configured to adjust an outlet-side refrigerant pressure of the air-cooling heat exchanger to be equal to or higher than an outlet-side refrigerant pressure of the low-pressure side refrigerant-heat medium heat exchanger.

8. The air conditioner according to claim 1, further comprising:
a controller configured to control operations of the high-temperature switching portion and the low-temperature switching portion, wherein
the high-temperature switching portion is controlled by the controller to cause the high-temperature heat medium to circulate between the high-pressure side refrigerant-heat medium heat exchanger and the high-temperature heat medium-outside air heat exchanger in the cooling mode; and to cause the high-temperature heat medium to circulate between the high-pressure side refrigerant-heat medium heat exchanger and the air-heating heat exchanger in the heating mode while the low-temperature switching portion causes the low-temperature heat medium to circulate between the low-pressure side refrigerant-heat medium heat exchanger and the low-temperature heat medium-outside air heat exchanger.

9. An air conditioner comprising:
a compressor configured to draw, compress, and discharge a refrigerant in a refrigerant cycle;
a first refrigerant-heat medium heat exchanger configured to exchange heat between the refrigerant discharged from the compressor and a first heat medium;
an air-heating heat exchanger configured to exchange heat between the first heat medium heat-exchanged in the first refrigerant-heat medium heat exchanger and air which is to be blown to a space to be air-conditioned;
a first heat medium-outside air heat exchanger configured to exchange heat between the first heat medium and outside air;
a first heat medium circuit in which the first heat medium circulates to the first refrigerant-heat medium heat exchanger, the air-heating heat exchanger, and the first heat medium-outside air heat exchanger;
a first decompression valve and a second decompression valve configured to decompress the refrigerant heat-exchanged in the first refrigerant-heat medium heat exchanger;
a second refrigerant-heat medium heat exchanger configured to exchange heat between the refrigerant decompressed by the second decompression valve and a second heat medium having a temperature lower than the first heat medium;
an air-cooling heat exchanger configured to exchange heat between the refrigerant decompressed by the first decompression valve and the air;
a heat generator configured to generate heat during an operation and to be cooled by the second heat medium;
a second heat medium-outside air heat exchanger configured to exchange heat between the second heat medium and the outside air;
a second heat medium circuit in which the second heat medium circulates to the second refrigerant-heat medium heat exchanger, the heat generator, and the second heat medium-outside air heat exchanger;
a first switching valve configured to switch a flow of the first heat medium in the first heat medium circuit;
a second switching valve configured to switch a flow of the second heat medium in the second heat medium circuit; and
a controller configured to control the first switching valve and the second switching valve, wherein
the refrigerant cycle is configured to be in a state where the refrigerant circulates through the air-cooling heat exchanger in a cooling mode and to be in a state where the refrigerant circulates through the second refrigerant-heat medium heat exchanger in a heating mode,
the first switching valve is controlled by the controller to cause the first heat medium to circulate between the first refrigerant-heat medium heat exchanger and the first heat medium-outside air heat exchanger in the cooling mode; and to cause the first heat medium to circulate between the first refrigerant-heat medium heat exchanger and the air-heating heat exchanger in the heating mode while the second switching valve causes the second heat medium to circulate between the second refrigerant-heat medium heat exchanger and the second heat medium-outside air heat exchanger, and
the second heat medium-outside air heat exchanger and the first heat medium-outside air heat exchanger have a common heat exchange promoting member that promotes heat exchange therebetween and are thermally connected to each other by the common heat exchange promoting member to transmit heat between the first heat medium circuit and the second heat medium circuit.

10. An air conditioner comprising:
a compressor configured to draw, compress, and discharge a refrigerant in a refrigerant cycle;
a first refrigerant-heat medium heat exchanger configured to exchange heat between the refrigerant discharged from the compressor and a first heat medium;
an air-heating heat exchanger configured to exchange heat between the first heat medium heat-exchanged in the first refrigerant-heat medium heat exchanger and air which is to be blown to a space to be air-conditioned;
a first heat medium-outside air heat exchanger configured to exchange heat between the first heat medium and outside air;
a first heat medium circuit in which the first heat medium circulates to the first refrigerant-heat medium heat exchanger, the air-heating heat exchanger, and the first heat medium-outside air heat exchanger;
a first decompression valve and a second decompression valve configured to decompress the refrigerant heat-exchanged in the first refrigerant-heat medium heat exchanger;
a second refrigerant-heat medium heat exchanger configured to exchange heat between the refrigerant decompressed by the second decompression valve and a second heat medium having a temperature lower than the first heat medium;
an air-cooling heat exchanger configured to exchange heat between the refrigerant decompressed by the first decompression valve and the air;
a heat generator configured to generate heat during an operation and to be cooled by the second heat medium;
a second heat medium-outside air heat exchanger configured to exchange heat between the second heat medium and the outside air;
a second heat medium circuit in which the second heat medium circulates to the second refrigerant-heat medium heat exchanger, the heat generator, and the second heat medium-outside air heat exchanger;
a first switching valve configured to switch a flow of the first heat medium in the first heat medium circuit;
a second switching valve configured to switch a flow of the second heat medium in the second heat medium circuit;
a pressure adjustment valve configured to adjust an outlet-side refrigerant pressure of the air-cooling heat exchanger to be equal to or higher than an outlet-side refrigerant pressure of the second refrigerant-heat-medium heat exchanger in a case where both the first decompression valve and the second decompression valve are opened;
a controller configured to control the pressure adjustment valve, the first switching valve and the second switching valve, wherein
the refrigerant cycle is configured to be in a state where the refrigerant circulates through the air-cooling heat exchanger in a cooling mode and to be in a state where the refrigerant circulates through the second refrigerant-heat medium heat exchanger in a heating mode,
the first switching valve is controlled by the controller to cause the first heat medium to circulate between the first refrigerant-heat medium heat exchanger and the first heat medium-outside air heat exchanger in the cooling mode; and to cause the first heat medium to circulate between the first refrigerant-heat medium heat exchanger and the air-heating heat exchanger in the heating mode while the second switching valve causes the second heat medium to circulate between the second refrigerant-heat medium heat exchanger and the second heat medium-outside air heat exchanger, and
the second heat medium-outside air heat exchanger and the first heat medium-outside air heat exchanger have a common heat exchange promoting member that promotes heat exchange therebetween and are thermally connected to each other by the common heat exchange promoting member to transmit heat between the first heat medium circuit and the second heat medium circuit.

11. The air conditioner according to claim 10, further comprising
a refrigerant flow switching portion configured to switch between a state in which the refrigerant circulates and a state in which the refrigerant does not circulate, with respect to each of the second refrigerant-heat medium heat exchanger and the air-cooling heat exchanger.

12. The air conditioner according to claim 11, wherein
the air conditioner executes, in addition to the cooling mode and the heating mode, a dehumidification heating mode in which the first switching valve causes the first heat medium to circulate between the first refrigerant-heat medium heat exchanger and the air-heating heat exchanger, while the refrigerant flow switching portion causes the refrigerant to circulate through the air-cooling heat exchanger, and
the refrigerant flow switching portion causes the refrigerant to circulate through the second refrigerant-heat medium heat exchanger if a capacity of the air-heating heat exchanger to heat the air is lower than a predetermined value when the dehumidification heating mode is executed.

13. The air conditioner according to claim 10, further comprising
a heat medium flow switching portion configured to switch a state in which the second heat medium circulates between the second refrigerant-heat medium heat exchanger and the heat generator and a state in which the second heat medium circulates between the second refrigerant-heat medium heat exchanger and the second heat medium-outside air heat exchanger.

14. The air conditioner according to claim 13, wherein
the heat medium flow switching portion causes the second heat medium to circulate between the second refrigerant-heat medium heat exchanger and at least one of the heat generator or the second heat medium-outside air heat exchanger when the refrigerant circulates through the second refrigerant-heat medium heat exchanger.

15. The air conditioner according to claim 10, further comprising
a heat medium flow switching portion configured to switch to a state in which the second heat medium circulates between the second heat medium-outside air heat exchanger and the heat generator.

16. The air conditioner according to claim 10, wherein
the second refrigerant-heat medium heat exchanger and the air-cooling heat exchanger are arranged in parallel with each other in a flow of the refrigerant, and
the first decompression valve is configured to decompress the refrigerant flowing into the air-cooling heat exchanger and the second decompression valve is configured to decompress the refrigerant flowing into the second refrigerant-heat medium heat exchanger.

17. The air conditioner according to claim 1, further comprising
a pressure adjustment valve configured to adjust an outlet-side refrigerant pressure of the air-cooling heat exchanger to be equal to or higher than an outlet-side refrigerant pressure of the low-pressure side refrigerant-heat medium heat exchanger.

* * * * *